(12) United States Patent
Sato et al.

(10) Patent No.: US 12,174,475 B2
(45) Date of Patent: Dec. 24, 2024

(54) COVER PANEL AND DISPLAY DEVICE

(71) Applicant: Panasonic Intellectual Property Management Co., Ltd., Osaka (JP)

(72) Inventors: Hiroaki Sato, Kanagawa (JP); Takahide Fujimoto, Kanagawa (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

(21) Appl. No.: 18/214,785

(22) Filed: Jun. 27, 2023

(65) Prior Publication Data
US 2024/0027809 A1 Jan. 25, 2024

(30) Foreign Application Priority Data
Jul. 22, 2022 (JP) ................. 2022-117499

(51) Int. Cl.
*G02F 1/1333* (2006.01)
*G02F 1/1335* (2006.01)

(52) U.S. Cl.
CPC .... *G02F 1/133331* (2021.01); *G02F 1/13338* (2013.01); *G02F 1/133502* (2013.01); *G02F 1/133528* (2013.01)

(58) Field of Classification Search
CPC ......... G02F 1/133607; G02F 1/133606; G02F 1/133528; G02F 1/133502; G02F 1/13338; G02F 1/133331
See application file for complete search history.

(56) References Cited

U.S. PATENT DOCUMENTS

| | | | | |
|---|---|---|---|---|
| 2011/0310470 A1* | 12/2011 | Horie | ............... | G02F 1/133502 359/352 |
| 2016/0178810 A1* | 6/2016 | Chung | .................. | G02B 3/005 359/741 |
| 2020/0117049 A1* | 4/2020 | Mimura | ............ | G02F 1/133528 |
| 2021/0149239 A1* | 5/2021 | Li | ........................ | G06F 1/1637 |
| 2023/0040154 A1* | 2/2023 | Park | ...................... | G02F 1/1676 |

FOREIGN PATENT DOCUMENTS

| JP | 2019-045842 A | 3/2019 |
|---|---|---|
| JP | 2021-099426 A | 7/2021 |

* cited by examiner

*Primary Examiner* — Mariam Qureshi
(74) *Attorney, Agent, or Firm* — GREENBLUM & BERNSTEIN, P.L.C.

(57) ABSTRACT

A cover panel according to the present disclosure includes a first reflection suppressing film and a first polarizing plate. The first polarizing plate is arranged between the first reflection suppressing film and a liquid crystal panel. The first polarizing plate polarizes light. The cover panel further includes at least one of a louver layer and a decorative layer. The louver layer includes light transmitting members and light absorbing members repeatedly arranged between the first reflection suppressing film and the first polarizing plate. The light transmitting members transmits light. The light absorbing members absorbs light. The decorative layer has a pattern. The cover panel is arranged to be separated from a liquid crystal panel.

16 Claims, 12 Drawing Sheets

FIG.5

| REFLECTANCE OF DISPLAY PART | SEAMLESS | |
|---|---|---|
| SCI Y | SCE ΔE*$_{ab}$ | SCI ΔE*$_{ab}$ |
| ≤2 | ≤0.4 | ≤5 |

COVER PANEL AND DISPLAY DEVICE

CROSS-REFERENCE TO RELATED APPLICATIONS

This application is based upon and claims the benefit of priority from Japanese Patent Application No. 2022-117499, filed on Jul. 22, 2022, the entire contents of which are incorporated herein by reference.

FIELD

The present disclosure relates to a cover panel and a display device.

BACKGROUND

In a display device including a liquid crystal panel, an image is displayed in a display region when it is operating. In the display device, when it is not operating, an image is not displayed in the display region but the surface may be irradiated with external light or reflected light thereof. The related techniques are described in: Japanese Patent Application Laid-open No. 2019-045842; and Japanese Patent Application Laid-open No. 2021-099426.

In the display device, it is desired that a boundary between the display region and a peripheral region of the liquid crystal panel is inconspicuous, and the display device is highly aesthetic.

The present disclosure provides a cover panel and a display device appropriate for increasing the aesthetic appeal of the display device.

SUMMARY

A cover panel according to the present disclosure includes a first reflection suppressing film and a first polarizing plate. The first polarizing plate is arranged between the first reflection suppressing film and a liquid crystal panel. The first polarizing plate polarizes light. The cover panel further includes at least one of a louver layer and a decorative layer. The louver layer includes light transmitting members and light absorbing members repeatedly arranged between the first reflection suppressing film and the first polarizing plate. The light transmitting members transmits light. The light absorbing members absorbs light. The decorative layer has a pattern. The cover panel is arranged to be separated from a liquid crystal panel.

BRIEF DESCRIPTION OF THE DRAWINGS

FIG. 5 is a diagram illustrating a reflection characteristic of the display device according to the first embodiment;

DETAILED DESCRIPTION

In the present disclosure, what is meant by the phrase that A is opposed to B includes a case where A and B face each other with directly contacting each other, and a case where A and B face each other without directly contacting each other. The latter includes a case where A and B face each other with another member interposed therebetween, and a case where A and B are separated from each other and face each other across an air layer.

Embodiments of a display device according to the present disclosure will be described below with reference to the drawings.

First Embodiment

The display device according to a first embodiment includes a liquid crystal panel, and may be installed in a front console of a driver's seat in a vehicle, for example. In the display device, an image is displayed in a display region when it is operating. In the display device, when it is not operating, an image is not displayed in the display region but the surface may be irradiated with external light or reflected light thereof.

Figure 1:
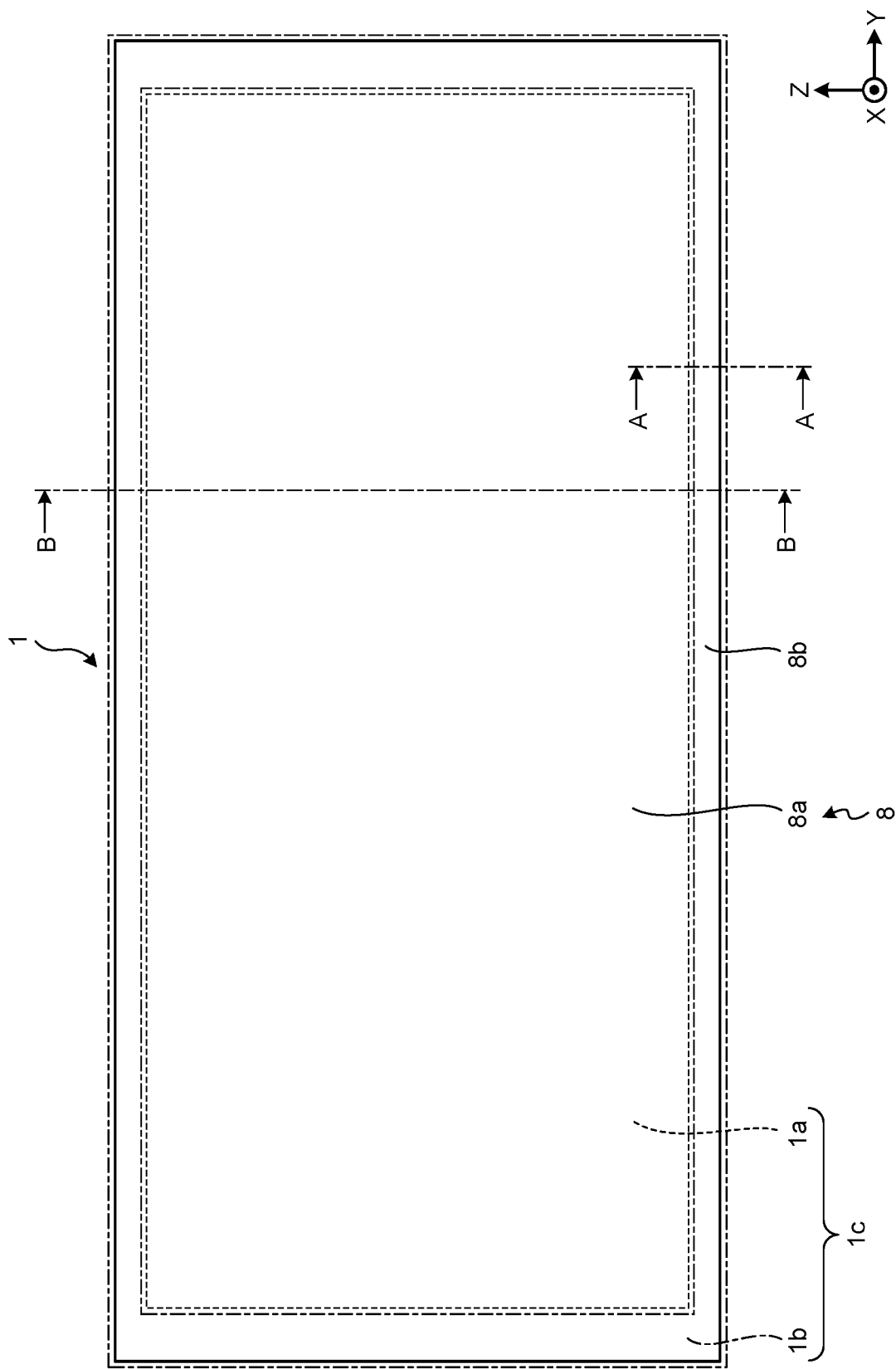
FIG. 1 is a plan view illustrating an external appearance configuration of a display device according to a first embodiment.
Figure 2:
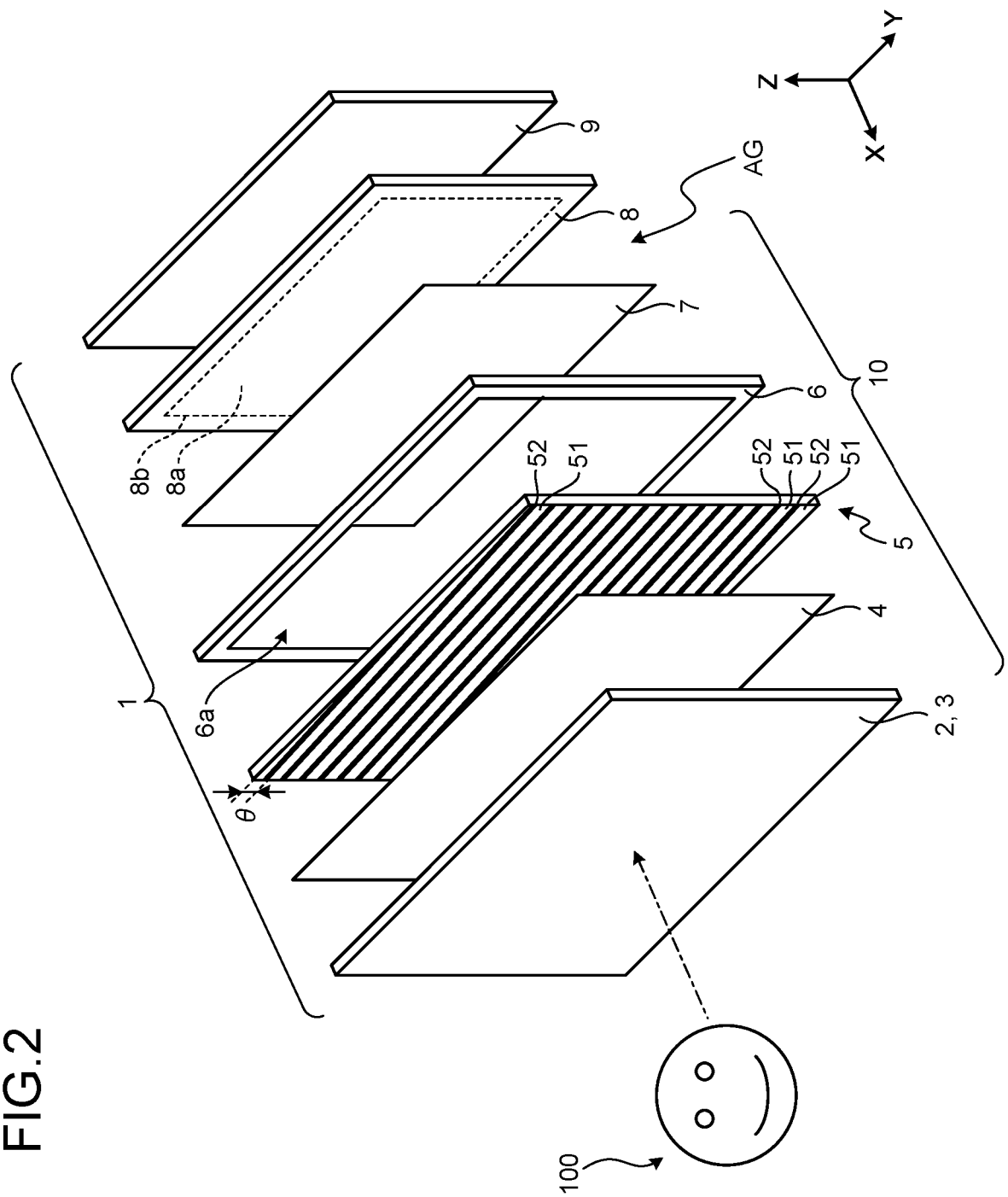
FIG. 2 is an exploded perspective view illustrating a schematic configuration of the display device according to the first embodiment.

For example, a display device 1 is configured as illustrated in FIG. 1 and FIG. 2. Hereinafter, a lateral direction of the display device 1 is assumed to be a Z-direction, a longitudinal direction thereof is assumed to be a Y-direction, and a direction perpendicular to the Z-direction and the Y-direction is assumed to be an X-direction. FIG. 1 is a YZ plan view illustrating an external appearance configuration of the display device 1. FIG. 2 is an exploded perspective view illustrating a schematic configuration of the display device 1. As illustrated in FIG. 2, a user 100 observes the display device 1 from a +X side, so that the +X side may be referred to as the front, a −X side may be referred to as the rear, a surface of a member on the +X side may be referred to as a front surface, and a surface of a member on the −X side may be referred to as a rear surface.

The external appearance of the display device 1 is desired to be aesthetic. To hide elements, wiring, terminals, and the like to increase the aesthetic appeal of the external appearance, a peripheral part 8b of a liquid crystal panel 8 is covered by a light-shielding frame 6 in the display device 1, but a pixel part 8a of the liquid crystal panel 8 is not covered by the light-shielding frame 6. A reflectance of a display region 1a is different from a reflectance of a peripheral region 1b on a surface 1c of the display device 1. Thus, in the display device 1, a louver layer 5 in which light transmitting members 51 and light absorbing members 52 are repeatedly arranged is disposed in a cover panel 10 in front of the liquid crystal panel 8. Due to this, in the display device 1, a difference between the reflectance of the display region 1a and the reflectance of the peripheral region 1b can be reduced, and a boundary between the display region 1a and the peripheral region 1b can be made inconspicuous when it is not operating. That is, seamlessness of the display region 1a and the peripheral region 1b on the surface 1c can be secured, and the aesthetic appeal of the display device 1 can be increased.

On the other hand, for the display device 1, a bonding-less structure may be employed. In the bonding-less structure, the liquid crystal panel 8 and the cover panel 10 in front thereof are arranged to be separated from each other via an air layer AG. Due to this, a degree of freedom in design of the display device 1 can be easily improved, and it is expected that the display device 1 can be upsized and/or is allowed to have a curved surface.

In the cover panel 10, for example, if the louver layer 5 is arranged in the rearmost position, the louver layer 5 is brought into contact with the air layer AG, and reflection of unnecessary light may be caused at an interface between the louver layer 5 and the air layer AG. In this case, an unnecessary pattern may be seen in the display region 1a on the surface of the display device 1 when it is operating. The unnecessary pattern is, for example, a rainbow, double images, or the like. Due to this, the aesthetic appeal of the display device 1 may be reduced.

Thus, in the present embodiment, in the display device 1 having the bonding-less structure, one of two polarizing plates, which are often arranged in the liquid crystal panel 8, is moved toward the cover panel 10 to be arranged between the louver layer 5 and the air layer AG. Due to this, seamlessness of the display region 1a and the peripheral region 1b is secured, and an unnecessary pattern is prevented from being generated in the display region 1a at the same time in the display device 1 having the bonding-less structure.

Figure 3:
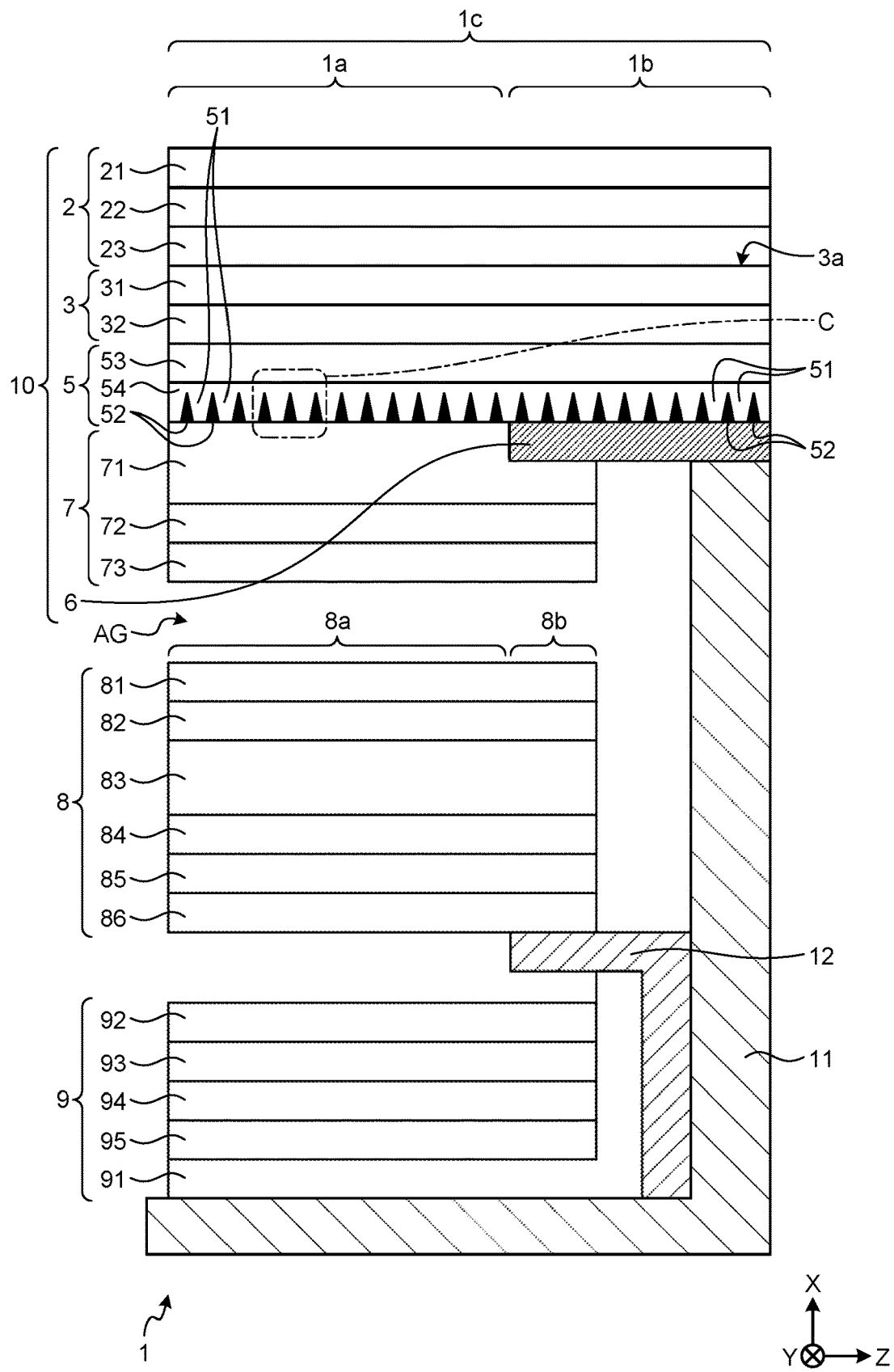
FIG. 3 is a cross-sectional view illustrating a configuration of the display device according to the first embodiment.

For example, the display device 1 may be configured as illustrated in FIG. 1 to FIG. 3. FIG. 3 is an XZ cross-sectional view illustrating a configuration of the display device 1. FIG. 3 exemplifies an XZ cross section when cutting FIG. 1 along the line A-A. FIG. 3 schematically illustrates an arrangement relation among layers in the structure of the XZ cross section, and a relation among the thicknesses of the layers may be different from the relation illustrated in the drawing. FIG. 3 exemplifies the structure of the XZ cross section corresponding to a portion of the peripheral region 1b extending in the Y-direction, but the concept of the present embodiment can also be applied to a structure of XY cross section corresponding to a portion of the peripheral region 1b extending in the Z-direction.

The display device 1 includes the cover panel 10, the liquid crystal panel 8, a backlight 9, a case 11, and a frame 12. The cover panel 10 is arranged on the +X side of the liquid crystal panel 8. The liquid crystal panel 8 is arranged on the +X side of the backlight 9.

In the liquid crystal panel 8, a plurality of display pixels are arranged in the YZ-direction in the pixel part 8a, and a circuit for controlling the plurality of display pixels is arranged in the peripheral part 8b. The display region 1a on the surface 1c of the display device 1 corresponds to the pixel part 8a of the liquid crystal panel 8, and the peripheral region 1b corresponds to the peripheral part 8b of the liquid crystal panel 8.

In the display device 1, a bonding-less structure in which the cover panel 10 and the liquid crystal panel 8 are not coupled to each other over the surface is formed. The cover panel 10 is arranged to be separated from the liquid crystal panel 8 toward the +X side. The air layer AG is interposed between the cover panel 10 and the liquid crystal panel 8.

The cover panel 10 and the liquid crystal panel 8 may be held by the case 11 and the frame 12. The cover panel 10 may be held via have a portion thereof corresponding to the peripheral region 1b by the case 11 from the −X side. The case 11 extends in the XZ-direction or the XY-direction, outside the liquid crystal panel 8 and the backlight 9 in the YZ-direction. The case 11 extends in the YZ-direction on the −X side of the backlight 9, and holds the backlight 9 from the −X side. The frame 12 is arranged inside the case 11 in the YZ-direction, and coupled to an inner surface of the case 11. The frame 12 extends inward from the inner surface of the case 11 in the YZ-direction. The liquid crystal panel 8 may be held via a portion thereof corresponding to the peripheral region 1b by the case 11 from the −X side via the frame 12. That is, the case 11 and the frame 12 function as support members to be connected to an edge of the cover panel 10 and an edge of the liquid crystal panel 8.

The cover panel 10 includes a reflection suppressing film 2, an optical layer 3, the louver layer 5, the light-shielding frame 6, and a polarizing layer 7. In the cover panel 10, the reflection suppressing film 2, the optical layer 3, the louver layer 5, the light-shielding frame 6, and the polarizing layer 7 are laminated in this order from the −X side to the +X side.

In the cover panel 10, the polarizing layer 7 is interposed between the louver layer 5 and the air layer AG. Due to this, it is possible to inhibit unnecessary light that enters the louver layer 5 through the surface 1c of the display device 1 from the outside from being reflected by an interface between the louver layer 5 and the polarizing layer 7, and inhibit an unnecessary pattern such as a rainbow and double images from being generated on the surface 1c of the display device 1.

The reflection suppressing film 2 is an example of the first reflection suppressing film. The reflection suppressing film 2 is arranged on the +X side of the optical layer 3, extends mainly in the YZ-direction in a plate shape, and has a substantially rectangular shape having a longitudinal direction in the Y-direction. The reflection suppressing film 2 covers a front surface 3a of the optical layer 3. Due to this, the reflection suppressing film 2 can suppress reflection of light incident on the front surface 3a of the optical layer 3, and can secure visibility of the display device at the time of displaying an image.

The reflection suppressing film 2 may be a film formed by performing reflection suppression optical processing on the front surface 3a of the optical layer 3, or a film formed by attaching a reflection suppressing optical film as another component to the front surface of the optical layer 3.

The reflection suppression optical processing is processing of coating the front surface 3a of the optical layer 3 with a substance that should become the reflection suppressing film 2 in a predetermined form. The reflection suppression optical processing may be, for example, anti fingerprint (AF) processing, anti glare (AG) processing, anti reflection (AR) processing, or AGAR processing. The AF processing is also called AF coating, the AG processing is also called AG coating, the AR processing is also called AR coating, and the AGAR processing is also called AGAR coating.

The reflection suppressing optical film may be an AF film 21, an AR film 22, an AG film 23, or a laminated film of two or more of them. In FIG. 3, the reflection suppressing film 2 is exemplified to have a configuration in which the AG film 23, the AR film 22, and the AF film 21 are laminated in this order in the X-direction.

The AF film 21 is formed of a material having an anti-fingerprint effect such as fluorocarbon. The AF film 21 prevents a fingerprint of a finger brought into contact with the surface of the display device 1 from remaining on the surface in the form where it is visible from the outside. Due to this, the AF film 21 can improve the visibility of the display device 1.

The AR film 22 can reduce reflected light by causing reflected lights to cancel each other by a multilayer film, and suppress specular reflection light and diffused reflection light. Due to this, the AR film 22 can improve the visibility of the display device 1.

The AG film 23 can diffuse the reflected light to become inconspicuous by an antiglare layer having a fine uneven structure, and mainly suppress specular reflection light. Due to this, the AG film 23 can improve the visibility of the display device 1.

The optical layer 3 is arranged opposite to the liquid crystal panel 8 with respect to the louver layer 5. The optical layer 3 is arranged on the −X side of the reflection suppressing film 2, and arranged on the +X side of an adhesive layer 32 and the louver layer 5. The optical layer 3 extends in the YZ-direction in a plate shape, and has a substantially rectangular shape having a longitudinal direction in the Y-direction. The optical layer 3 includes a base material 31 and the adhesive layer 32. The base material 31 is attached to the front surface of the louver layer 5 via the adhesive layer 32. The base material 31 has translucency. The base material 31 may be formed of inorganic glass containing $SiO_2$, or may be formed of organic glass containing transparent resin such as polymethyl methacrylate resin (PMMA) or polycarbonate (PC).

The base material 31 has higher rigidity than that of the louver layer 5. Due to this, the base material 31 can flatly support the louver layer 5 via the adhesive layer 32.

The base material 31 has a smooth and flat front surface because of high rigidity. Due to this, the surface 1c of the display device 1 can be visually recognized to be smooth and flat when the display device 1 is not operating, and texture and quality of the display device 1 can be easily improved. The display device 1 can also suppress distortion of an image at the time of displaying the image, so that display quality of the display device 1 can be improved.

The adhesive layer 32 is held between the base material 31 and the louver layer 5. The adhesive layer 32 is arranged on the −X side of the base material 31, and arranged on the +X side of the louver layer 5. The adhesive layer 32 extends in the YZ-direction in a plate shape, and has a substantially rectangular shape having a longitudinal direction in the Y-direction. A front surface of the adhesive layer 32 is in contact with the optical layer 3, and a rear surface thereof is in contact with the louver layer 5. The adhesive layer 32 contains a translucent adhesive, and bonds the optical layer 3 to the louver layer 5. The translucent adhesive may be an optical glue such as an optical clear resin (OCR) or an optical clear adhesive (OCA).

The louver layer 5 is arranged between the reflection suppressing film 2 and a polarizing plate 72 of the polarizing layer 7. The louver layer 5 is arranged opposite to the liquid crystal panel 8 with respect to the light-shielding frame 6. The louver layer 5 is arranged on the −X side of the reflection suppressing film 2 and the optical layer 3, and arranged on the +X side of the light-shielding frame 6, the polarizing layer 7, and the liquid crystal panel 8. The louver layer 5 extends in the YZ-direction in a plate shape, and has a substantially rectangular shape having a longitudinal direction in the Y-direction. In the louver layer 5, the light transmitting members 51 and the light absorbing members 52 are alternately and repeatedly arranged along the Z-direction.

The louver layer 5 includes the light transmitting members 51, the light absorbing members 52, and a base material 53. The light transmitting members 51 are arranged on the −X side of the base material 53. The light absorbing members 52 are arranged on the −X side of the base material 53. As illustrated in FIG. 2, each of the light transmitting members 51 extends along the Y-direction. The light transmitting members 51 are arranged in the Z-direction. The light transmitting members 51 are periodically arranged at predetermined Z-direction arrangement pitches P1. Each of the light absorbing members 52 extends along the Y-direction. The light absorbing members 52 are arranged in the Z-direction. The light absorbing members 52 may be periodically arranged at the predetermined Z-direction arrangement pitches P1. Each of the light absorbing members 52 may have an optional absorption rate corresponding to a required function thereof as a light absorption rate. When having the absorption rate close to 100%, each of the light absorbing members 52 may function as a light-shielding member. Due to this, the louver layer 5 can block external light such as sunlight that is obliquely incident from the −X side/+Z side when the display device 1 is not operating. The louver layer 5 can also block external light such as sunlight that is obliquely incident from the −X side/+Z side while transmitting light from the liquid crystal panel 8 toward the +X-direction at the time of displaying an image.

For example, each of the light transmitting members 51 may extend in the Y-direction, and each of the light absorbing members 52 may extend in the Y-direction.

Alternatively, as a countermeasure against moire, each of the light absorbing members 52 may extend in a direction inclined at a predetermined bias angle θ with respect to the Y-direction as illustrated in FIG. 2. FIG. 2 exemplifies a configuration in which each of the light absorbing members 52 extends in the direction inclined at the predetermined bias angle θ with respect to the Y-direction. The bias angle θ may be determined in advance in accordance with the Z-direction arrangement pitch P1 of the light absorbing member 52 and a Z-direction arrangement pitch P1' of the display pixel of the liquid crystal panel 8. The bias angle θ may be an angle larger than 0° and smaller than 10°. The bias angle θ may be determined to be a value close to 0° when the Z-direction arrangement pitch P1 of the light absorbing member 52 is smaller than the Z-direction arrangement pitch P1' of the display pixel, and the bias angle θ may be determined to be a value close to 10° when the Z-direction arrangement pitch P1 of the light absorbing member 52 is a value equivalent to the Z-direction arrangement pitch P1' of the display pixel.

Figure 4:
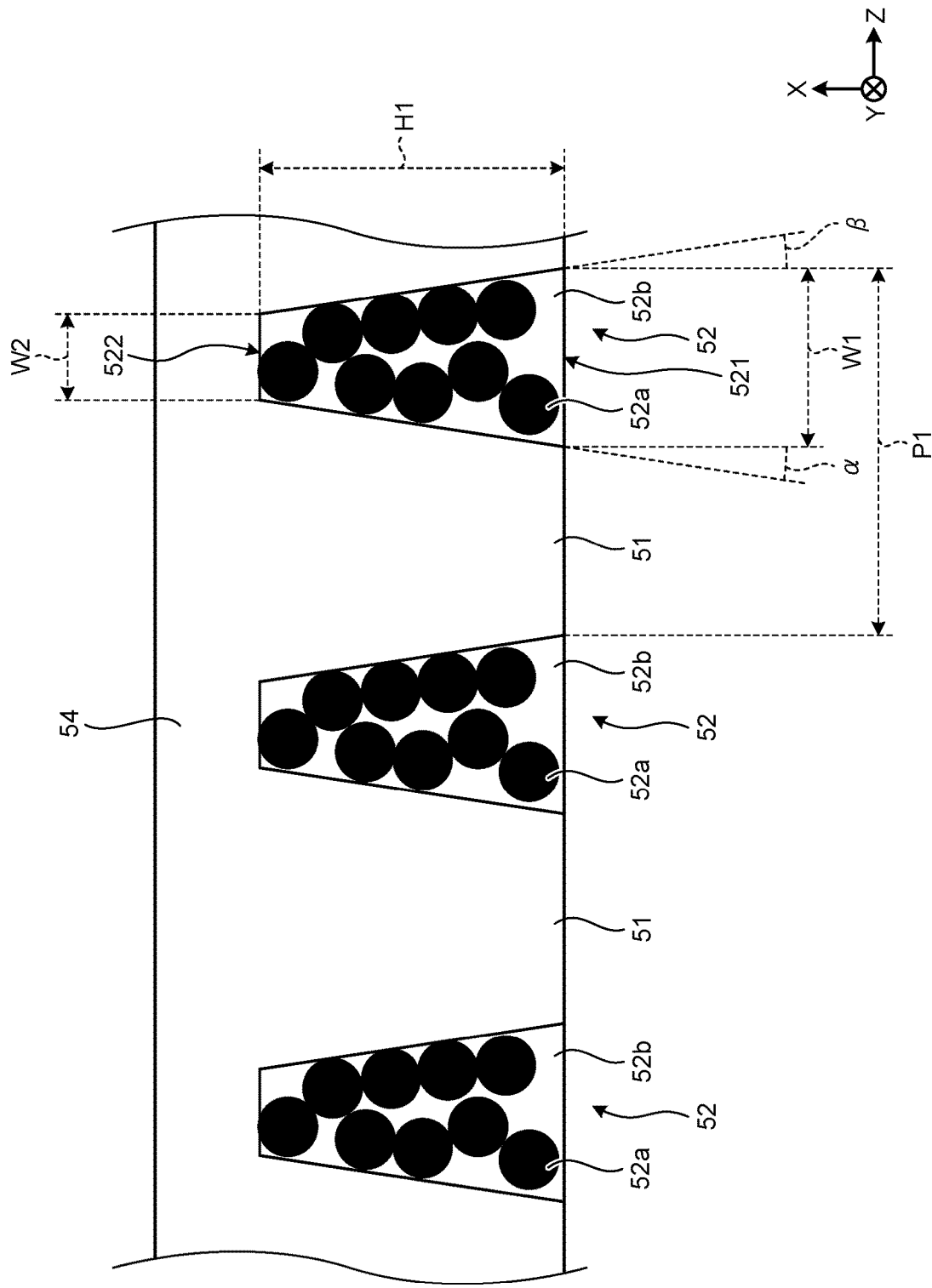
FIG. 4 is an enlarged cross-sectional view illustrating a configuration of a louver layer according to the first embodiment.

As illustrated in FIG. 4, the light transmitting member 51 is a portion between the light absorbing members 52 in a shaping layer 54 extending in the YZ-direction in a plate shape. FIG. 4 is an enlarged cross-sectional view illustrating a configuration of the louver layer 5, which is a cross-sectional view enlarging a C portion in FIG. 3. The shaping layer 54 may be formed of translucent resin such as highly transparent silicone rubber. The light absorbing member 52 may be formed of black silicone rubber, or may be formed by causing light absorption particles 52a to be contained in a binder resin 52b as illustrated in FIG. 4. The light absorption particles 52a may be acrylic beads containing carbon black. The binder resin 52b may be translucent resin such as PMMA.

An XZ cross-sectional shape of the light absorbing member 52 is appropriate for being formed with low cost, and may be an optional shape appropriate for its function. From a viewpoint of lowering cost, a Z-direction dimension W2 on the +X side of the light absorbing member 52 is smaller than a Z-direction dimension W1 on the −X side in an XZ cross-sectional view. A YZ cross-sectional area of a surface 522 on the +X side of the light absorbing member 52 is smaller than a YZ cross-sectional area of a surface 521 on the −X side of the light absorbing member 52. Here, the YZ cross-sectional area of the surface 522 is an example of a first cross-sectional area. The YZ cross-sectional area of the surface 522 is parallel to a front surface of the reflection suppressing film 2. Further, the YZ cross-sectional area of the surface 521 is an example of a second cross-sectional area. The YZ cross-sectional area of the surface 521 is parallel to the front surface of the reflection suppressing film 2, and is located closer to the polarizing plate 72 than the YZ cross-sectional area of the surface 522 is. FIG. 4 exemplifies a substantially trapezoidal shape including two parallel sides along the Z-direction as the XZ cross-sectional shape of the light absorbing member 52. The XZ cross-sectional shape of the light absorbing member 52 may be a substantially triangular shape including a base along the Z-direction.

The Z-direction dimension W2 on the +X side of the light absorbing member 52 is smaller than the Z-direction dimension W1 on the −X side thereof in the XZ cross-sectional view, so that light for displaying an image can be efficiently transmitted from the liquid crystal panel 8 toward the surface 1c via the louver layer 5. Due to this, the display device 1 can easily secure a viewing angle of an image to be displayed on the surface 1c when the display device 1 is operating.

The Z-direction arrangement pitch P1 of the light absorbing member 52 may take an optional value appropriate for its function. From a viewpoint of effectively transmitting light of the liquid crystal panel 8 and blocking external light, the Z-direction arrangement pitch P1 of the light absorbing member 52 is preferably equal to or larger than 20 μm and equal to or smaller than 100 μm, and more preferably equal to or larger than 30 μm and equal to or smaller than 100 μm.

From a viewpoint of effectively transmitting light of the liquid crystal panel 8 and blocking external light, the Z-direction dimension W1 on the +X side of the light absorbing member 52 is preferably equal to or smaller than half of the Z-direction arrangement pitch P1. The Z-direction dimension W2 on the −X side of the light absorbing member 52 is preferably equal to or smaller than half of the Z-direction dimension W1 on the +X side.

An X-direction height H1 of the light absorbing member 52 may take an optional value appropriate for its function. From a viewpoint of effectively transmitting light of the liquid crystal panel 8 and blocking external light, the X-direction height H1 of the light absorbing member 52 is preferably equal to or larger than 50 μm and equal to or smaller than 150 μm, and more preferably equal to or larger than 60 μm and equal to or smaller than 150 μm.

An inclination angle $\alpha$ of a side surface on the −Z side of the light absorbing member 52 may take an optional value appropriate for its function. From a viewpoint of effectively transmitting light of the liquid crystal panel 8 and blocking external light, the inclination angle $\alpha$ is preferably larger than 0° and equal to or smaller than 10° as an inclination angle from the X-direction toward the −Z side.

An inclination angle $\beta$ of a side surface on the +Z side of the light absorbing member 52 may take an optional value appropriate for its function. From a viewpoint of effectively transmitting light of the liquid crystal panel 8 and blocking external light, the inclination angle $\beta$ is preferably larger than 0° and equal to or smaller than 10° as an inclination angle from the X-direction toward the +Z side.

The base material 53 illustrated in FIG. 3 extends in the YZ-direction in a plate shape, and has a substantially rectangular shape having the longitudinal direction in the Y-direction. The base material 53 may be formed of a translucent material such as polyethylene terephthalate (PET), triacetyl cellulose (TAC), an acrylic resin, and polycarbonate (PC). The base material 53 can support the louver layer 5.

The light-shielding frame 6 is arranged between the louver layer 5 and the liquid crystal panel 8. The light-shielding frame 6 is arranged on the −X side of the louver layer 5, and arranged on the +X side of the polarizing layer 7 and the liquid crystal panel 8. The light-shielding frame 6 has a substantially rectangular outer contour having a longitudinal direction in the Y-direction. The light-shielding frame 6 has an opening 6a corresponding to the pixel part 8a of the liquid crystal panel 8. The light-shielding frame 6 overlaps a peripheral portion of the polarizing plate 72 of the polarizing layer 7 when transparently viewed from the X-direction. The light-shielding frame 6 covers the peripheral part 8b of the liquid crystal panel 8 via the polarizing layer 7 and the air layer AG. Due to this, elements, wiring, terminals, and the like arranged on the peripheral part 8b of the liquid crystal panel 8 can be shielded, and external appearance of the display device 1 can be improved.

A color of the light-shielding frame 6 corresponds to a color of the pixel part 8a. If the pixel part 8a is black, the light-shielding frame 6 may be a black printing formed by applying resin containing black pigment to a rear surface of the louver layer 5, or a frame-like sheet made of resin containing black pigment attached to the rear surface of the louver layer 5.

A reflection characteristic of the light-shielding frame 6 corresponds to a reflection characteristic of the pixel part 8a of the liquid crystal panel 8. If the pixel part 8a has a color that is easily diffused and reflected, the light-shielding frame 6 has a color that is easily diffused and reflected. If the pixel part 8a has a color that is hardly diffused and reflected, the light-shielding frame 6 has a color that is hardly diffused and reflected. If the pixel part 8a is glossy black, the light-shielding frame 6 is glossy black. If the pixel part 8a is mat black, the light-shielding frame 6 is mat black. The following mainly exemplifies a case in which the light-shielding frame 6 is glossy black.

The polarizing layer 7 is arranged between the liquid crystal panel 8, and the louver layer 5 and the light-shielding frame 6. The polarizing layer 7 is arranged on the −X side of the louver layer 5 and the light-shielding frame 6, and arranged on the +X side of the liquid crystal panel 8. The polarizing layer 7 extends in the YZ-direction in a plate shape, and has a substantially rectangular shape having a longitudinal direction in the Y-direction. A front surface of the polarizing layer 7 is in contact with the louver layer 5 and the light-shielding frame 6, and a rear surface thereof is separated from the liquid crystal panel 8 in the −X-direction via the air layer AG. The polarizing layer 7 polarizes light.

The polarizing layer 7 includes an adhesive layer 71, the polarizing plate 72, and a reflection suppressing film 73. The adhesive layer 71 contains a translucent adhesive, and bonds the louver layer 5 and the light-shielding frame 6 to the polarizing plate 72. The translucent adhesive may be an optical glue such as an OCR or an OCA.

The polarizing plate 72 is an example of the first polarizing plate. The polarizing plate 72 is arranged between the reflection suppressing film 2 and the liquid crystal panel 8. The polarizing plate 72 is held between the adhesive layer 71 and the reflection suppressing film 73. The polarizing plate 72 polarizes light. The polarizing plate 72 serves part of an image display function of the liquid crystal panel 8, and serves a filter function for attenuating unnecessary light. The polarizing plate 72 functions as a polarizing plate in front of a liquid crystal layer 83 of the liquid crystal panel 8, and functions as a filter for unnecessary light. The polarizing plate 72 transmits light in a properly polarized state, and attenuates light in an improperly polarized state. The light in the properly polarized state includes light for displaying an image that may be incident from the liquid crystal panel 8. The light in the improperly polarized state includes unnecessary light that is incident from the outside through the louver layer 5. Due to this, when light for displaying an image is incident from the liquid crystal panel 8, the polarizing layer 7 can transmit the light for displaying an image. The polarizing layer 7 can attenuate unnecessary light when the unnecessary light is incident from the louver layer 5.

The reflection suppressing film 73 is an example of a second reflection suppressing film. The reflection suppressing film 73 is arranged between the polarizing plate 72 and the air layer AG. The reflection suppressing film 73 is arranged on a rearmost surface side of the polarizing layer 7. More specifically, the reflection suppressing film 73 is arranged on the rear surface of the polarizing plate 72. Here, the front surface of the polarizing plate 72 is an example of a first surface. Further, the rear surface of the polarizing plate 72 is an example of a second surface. The reflection suppressing film 73 suppresses reflection of light at the rear surface of the polarizing layer 7. The reflection suppressing film 73 suppresses reflection of light for displaying an image that is incident from the liquid crystal panel 8 via the air layer AG, at the rear surface of the polarizing layer 7, and transmits the light for displaying an image. The reflection suppressing film 73 suppresses reflection of unnecessary light that is incident from the outside through the louver layer 5 and the polarizing plate 72, at the rear surface of the polarizing layer 7, and attenuates the unnecessary light.

The reflection suppressing film 73 may be a film formed by attaching a reflection suppressing optical film as another component to the rear surface of the polarizing plate 72, or a film formed by performing reflection suppression optical processing on the rear surface of the polarizing plate 72.

The reflection suppression optical processing is processing of coating the rear surface of the polarizing plate 72 with a substance that should become the reflection suppressing film 73 in a predetermined form. The reflection suppression optical processing may be, for example, AG processing, AR processing, or AGAR processing. The AG processing is also called AG coating, the AR processing is also called AR coating, and the AGAR processing is also called AGAR coating.

The reflection suppressing optical film may be an AR film, an AG film, or a laminated film of two or more of them.

The AR film can reduce reflected light by causing reflected lights to cancel each other by a multilayer film, and suppress specular reflection light and diffused reflection light. Due to this, the AR film can suppress reflection of unnecessary light at an interface between the rear surface of the polarizing plate 72 and the air layer AG.

The AG film can cause the reflected light to be diffused and become inconspicuous by an antiglare layer having a fine uneven structure, and mainly suppress specular reflection light. Due to this, the AG film can suppress reflection of unnecessary light at the interface between the rear surface of the polarizing plate 72 and the air layer AG.

The liquid crystal panel 8 is arranged on the −X side of the louver layer 5, the light-shielding frame 6, and the polarizing layer 7, arranged on the +X side of the backlight 9, extends in the YZ-direction in a plate shape, and has a substantially rectangular shape having a longitudinal direction in the Y-direction. The liquid crystal panel 8 includes the pixel part 8a and the peripheral part 8b. The pixel part 8a is a portion in which the display pixels are arranged in the YZ-direction, and is a portion of the liquid crystal panel 8 that is not covered by the light-shielding frame 6. The peripheral part 8b is a portion arranged around the pixel part 8a, and is a portion of the liquid crystal panel 8 that is covered by the light-shielding frame 6.

The liquid crystal panel 8 includes the liquid crystal layer 83, does not include a polarizing plate on the +X side, and includes a polarizing plate 86 on the −X side. The liquid crystal layer 83 can implement a display function thereof with the polarizing plate 72 in the cover panel 10 as a front polarizing plate and the polarizing plate 86 as a rear polarizing plate. The polarizing plate 86 is an example of a second polarizing plate.

The liquid crystal panel 8 further includes a reflection suppressing film 81, an adhesive layer 82, an adhesive layer 84, and a phase difference plate 85. The reflection suppressing film 81, the adhesive layer 82, the liquid crystal layer 83, the adhesive layer 84, the phase difference plate 85, and the polarizing plate 86 are laminated in this order from the +X side to the −X side. Each of the reflection suppressing film 81, the adhesive layer 82, the liquid crystal layer 83, the adhesive layer 84, the phase difference plate 85, and the polarizing plate 86 has a substantially rectangular shape having a longitudinal direction in the Y-direction.

The reflection suppressing film 81 may be an AR film, an AG film, or a laminated film of two or more of them.

The adhesive layer 82 contains a translucent adhesive, and bonds the liquid crystal layer 83 to the reflection suppressing film 81. The translucent adhesive may be an optical glue such as an OCR or an OCA.

In the pixel part 8a of the liquid crystal layer 83, a liquid crystal material is sealed in between a pair of transparent substrates that are arranged to be separated from each other in the X-direction and respectively extend in the Y-direction and the Z-direction, and a display pixel is formed at an intersecting position of the pair of transparent substrates. In the pixel part 8a of the liquid crystal layer 83, the display pixels are arranged in the YZ-direction. On the peripheral part 8b of the liquid crystal layer 83, end parts of the pair of transparent substrates are arranged, a member for sealing the liquid crystal material is arranged, and a peripheral circuit is arranged. The peripheral circuit is a circuit for controlling the display pixels, and includes elements, wiring, terminals, and the like. Each of the pair of transparent substrates is formed of a transparent conductive material such as ITO.

The adhesive layer 84 contains a translucent adhesive, and bonds the liquid crystal layer 83 to the phase difference plate 85. The translucent adhesive may be an optical glue such as an OCR or an OCA.

The backlight 9 is arranged on the −X side of the liquid crystal panel 8, extends in the YZ-direction in a plate shape, and has a substantially rectangular shape having a longitudinal direction in the Y-direction. The backlight 9 illuminates the liquid crystal panel 8 from the −X side.

The backlight 9 includes a case 91, a dual brightness enhancement film (DBEF) layer 92, a prism sheet 93, a diffusion sheet/light guide plate 94, and a reflective sheet 95. The case 91 has a box shape opened on the +X side. The DBEF layer 92, the prism sheet 93, the diffusion sheet/light guide plate 94, and the reflective sheet 95 are housed in the case 91, and laminated in this order from the +X side to the −X side in the case 91. Each of the DBEF layer 92, the prism sheet 93, the diffusion sheet/light guide plate 94, and the reflective sheet 95 has a substantially rectangular shape having a longitudinal direction in the Y-direction.

In the display device 1, the louver layer 5 in which the light transmitting members 51 and the light absorbing members 52 are repeatedly arranged is arranged on the +X side of the liquid crystal panel 8 and the light-shielding frame 6. Due to this, a reflection characteristic of the display region 1*a* and a reflection characteristic of the peripheral region 1*b* can be brought close to each other. The peripheral region 1*b* is a region on the +X side of the peripheral part 8*b*. The display region 1*a* is a region on the +X side of the pixel part 8*a*. As a result, when observing the surface 1*c* of the display device 1 from the +X side, a boundary between the pixel part 8*a* and the peripheral part 8*b* of the liquid crystal panel 8 can be made inconspicuous and seamless.

For example, in the display device 1, assuming that a reflectance of the display region 1*a* is Y, $$Y \leq 2 \qquad \text{numerical expression 1}$$

is satisfied when measurement is performed by using an SCI scheme as illustrated in FIG. 5.

In the display device 1, assuming that a color difference between the display region 1*a* and the peripheral region 1*b* is $\Delta E^*_{ab}$, $$\Delta E^*_{ab} \leq 5 \qquad \text{numerical expression 2}$$

is satisfied when measurement is performed by using the SCI scheme as illustrated in FIG. 5, and $$\Delta E^*_{ab} \leq 0.4 \qquad \text{numerical expression 3}$$

is satisfied when measurement is performed by using an SCE scheme. The color difference $\Delta E^*_{ab}$ between the display region 1*a* and the peripheral region 1*b* can be used as an indicator indicating a degree of seamless observation of the display region 1*a* and the peripheral region 1*b*.

The SCI scheme is a measurement method conforming to JIS Z 8722, and is a measurement method for a reflection characteristic including specular reflection light. In measurement using the SCI scheme, an integrating sphere not including an optical trap is arranged on the display device 1, a light source and a photodetector are attached to the integrating sphere, and a characteristic of reflected light including specular reflection light is measured.

The SCE scheme is a measurement method conforming to JIS Z 8722, and is a measurement method for a reflection characteristic except specular reflection light. In measurement using the SCE scheme, an integrating sphere including an optical trap is arranged on the display device 1, a light source and a photodetector are attached to the integrating sphere, and specular reflection light is removed by the optical trap to measure the characteristic of reflected light.

When using the SCI scheme, the reflectance Y of the display region 1*a* may be measured by using the integrating sphere not including the optical trap and using a spectrophotometer as the photodetector. Assuming that reflection luminance $I_0$ of a white calibration plate (white complete diffusion plate) is 100, if received light intensity obtained by measuring the display region 1*a* by the spectrophotometer is $I_1$, the reflectance Y [%] of the display region 1*a* may be obtained by the following numerical expression 4.

$$Y = (I_1/I_0) \times 100 \qquad \text{numerical expression 4}$$

When using the SCI scheme, the color difference $\Delta E^*_{ab}$ between the display region 1*a* and the peripheral region 1*b* may be measured by using the integrating sphere not including the optical trap and using a colorimeter as the photodetector. The colorimeter can measure a color of a measurement target, and lightness L*, a chromaticity a*, and a chromaticity b* in a L*a*b* color system can be obtained as a measurement result. The measurement result (L*, a*, b*) indicates color coordinates of the measurement target in the L*a*b* color system. A color difference between two measurement targets is obtained by converting difference in color into a numerical value, and may be obtained as a Euclidean distance between the two color coordinates measured by the colorimeter. That is, if the measurement result of the display region 1*a* obtained by the colorimeter is $(L_1^*, a_1^*, b_1^*)$, and the measurement result of the peripheral region 1*b* obtained by the colorimeter is $(L_2^*, a_2^*, b_2^*)$, the color difference $\Delta E^*_{ab}$ may be obtained by the following numerical expression 5.

$$\Delta E^*_{ab} = [\sqrt{\{(L_1^* - L_2^*)^2 + (a_1^* - a_2^*)^2 + (b_1 - b_2)^2\}}] \qquad \text{numerical expression 5}$$

When using the SCE scheme, the color difference $\Delta E^*_{ab}$ between the display region 1*a* and the peripheral region 1*b* may be measured by using the integrating sphere including the optical trap and a colorimeter as the photodetector. If the measurement result of the display region 1*a* obtained by the colorimeter is $(L_3^*, a_3^*, b_3^*)$, and the measurement result of the peripheral region 1*b* obtained by the colorimeter is $(L_4^*, a_4^*, b_4^*)$, the color difference $\Delta E^*_{ab}$ may be obtained by the following numerical expression 6.

$$\Delta E^*_{ab} = [\sqrt{\{(L_3^* - L_4^*)^2 + (a_3^* - a_4^*)^2 + (b_3 - b_4)^2\}}] \qquad \text{numerical expression 6}$$

The display device 1 may be configured to satisfy the numerical expression 1 to the numerical expression 3 by adjusting the Z-direction arrangement pitch P1 of the light absorbing member 52 in the louver layer 5, the reflection characteristic of the light-shielding frame 6, and the like. For example, the display device 1 may be configured to have the reflectance Y=1.7 obtained by the SCI scheme, the color difference $E^*_{ab}$=1.4 obtained by the SCI scheme, and the $E^*_{ab}$=0.2 obtained by the SCE scheme as indicators of a degree of seamlessness. The display device 1 is configured to satisfy the numerical expression 1 to the numerical expression 3, so that a boundary between the pixel part 8*a* and the peripheral part 8*b* of the liquid crystal panel 8 may become inconspicuous and seamless when observed from the surface 1*c*. That is, by disposing the louver layer 5 in front of the liquid crystal panel 8 and the light-shielding frame 6 in the display device 1, seamlessness of the display region 1*a* and the peripheral region 1*b* on the surface 1*c* can be secured.

As described above, in the first embodiment, the display device 1 employs the bonding-less structure in which the cover panel 10 and the liquid crystal panel 8 are separated from each other in the X-direction, and the air layer AG is interposed therebetween. The polarizing plate 72 in front of the liquid crystal layer 83 of the liquid crystal panel 8 is arranged between the louver layer 5 and the air layer AG. Due to this, seamlessness of the display region 1*a* and the peripheral region 1*b* can be secured, and an unnecessary pattern can be prevented from being generated in the display region 1*a* at the same time in the display device 1 having the bonding-less structure. Thus, a degree of freedom in design of the display device 1 can be easily improved, and the aesthetic appeal of the external appearance of the display device 1 can be increased.

The reflection suppressing film 2 may also include a moth-eye film (not illustrated). The reflection suppressing film 2 may be the AF film 21, the AR film 22, the AG film 23, the moth-eye film, or a laminated film of two or more of them.

On the moth-eye film, a large number of nano-level minute projections are arranged at regular intervals. The moth-eye film hardly reflects incident light and can transmit it due to its structure. Due to this, the moth-eye film can improve visibility of the display device 1.

Second Embodiment

Next, the following describes a display device 101 according to a second embodiment. The following mainly describes differences from the first embodiment.

The first embodiment exemplifies the configuration in which the light-shielding frame 6 is arranged between the louver layer 5 and the polarizing layer 7, but the light-shielding frame 6 may be arranged at another position at which seamlessness of the display region 1a and the peripheral region 1b can be secured.

Figure 6:
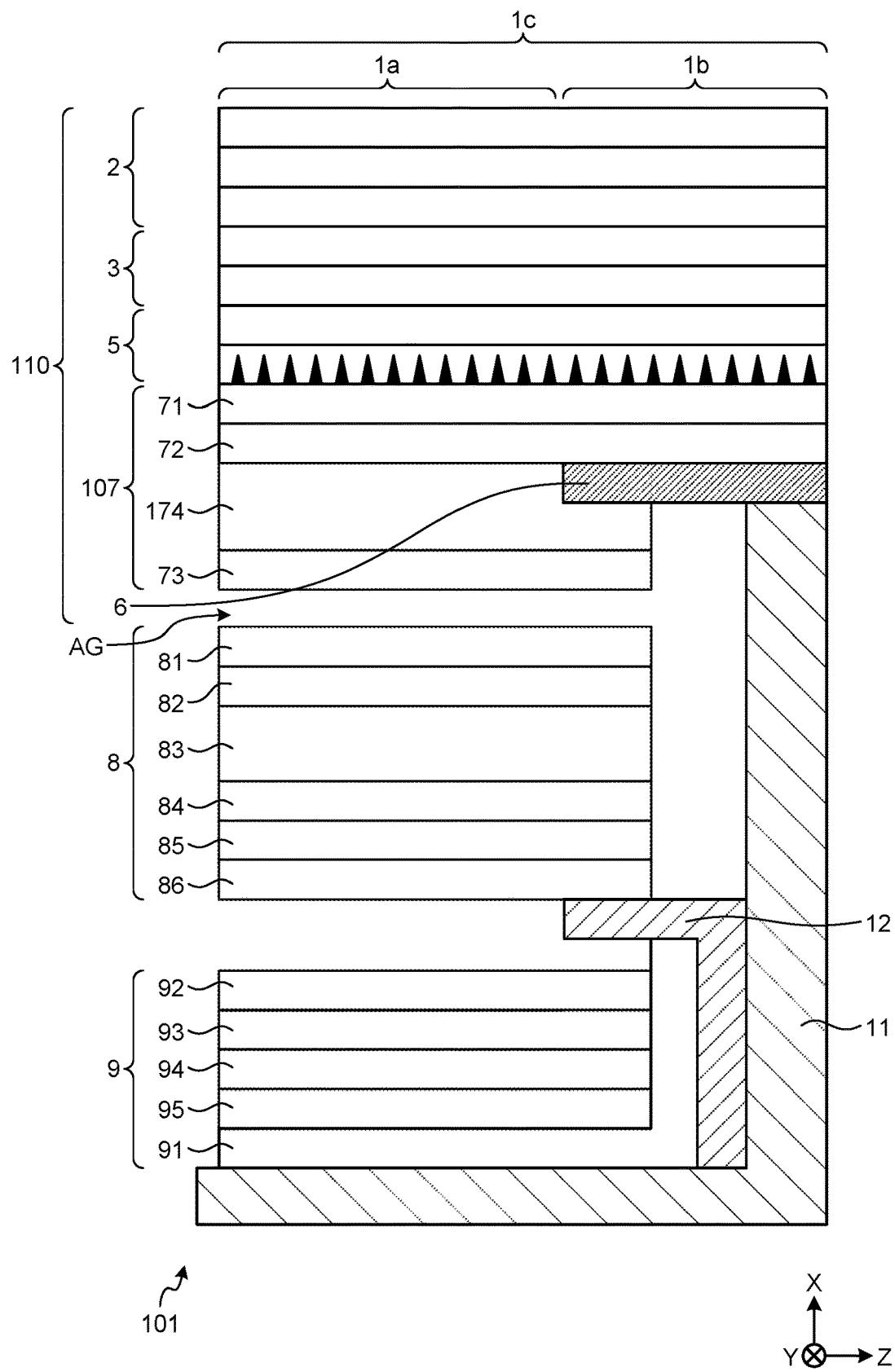
FIG. 6 is a cross-sectional view illustrating a configuration of a display device according to a second embodiment.

As illustrated in FIG. 6, the second embodiment exemplifies a configuration in which the light-shielding frame 6 is arranged between the polarizing plate 72 and the reflection suppressing film 73. FIG. 6 is an XZ cross-sectional view illustrating a configuration of the display device 101 according to the second embodiment. FIG. 6 schematically illustrates an arrangement relation among respective layers in the structure of the XZ cross section, and a relation among the thicknesses of the respective layers may be different from the relation illustrated in the drawing. FIG. 6 exemplifies the structure of the XZ cross section corresponding to a portion extending in the Y-direction of the peripheral region 1b, but the concept of the present embodiment can also be applied to a structure of XY cross section corresponding to a portion extending in the Z-direction of the peripheral region 1b.

As compared with the display device 1 illustrated in FIG. 3, the display device 101 illustrated in FIG. 6 includes a cover panel 110 in place of the cover panel 10. The cover panel 110 includes a polarizing layer 107 in place of the polarizing layer 7. The polarizing layer 107 further includes an adhesive layer 174 between the polarizing plate 72 and the reflection suppressing film 73. The light-shielding frame 6 is arranged between the polarizing plate 72 and the liquid crystal panel 8. The light-shielding frame 6 is arranged between the polarizing plate 72 and the reflection suppressing film 73. The adhesive layer 174 contains a translucent adhesive, and may bond the reflection suppressing film 73 to a rear surface of the polarizing plate 72. The translucent adhesive may be an optical glue such as an OCR or an OCA.

In the display device 101, the louver layer 5 is disposed in front of the liquid crystal panel 8 and the light-shielding frame 6 similarly to the first embodiment. Due to this, seamlessness of the display region 1a and the peripheral region 1b on the surface 1c of the display device 101 can be secured.

In the display device 101 as described above, the polarizing plate 72 in front of the liquid crystal layer 83 of the liquid crystal panel 8 is arranged between the louver layer 5 and the air layer AG. Due to this, seamlessness of the display region 1a and the peripheral region 1b can be secured, and an unnecessary pattern can be prevented from being generated in the display region 1a at the same time in the display device 101 having the bonding-less structure. Thus, a degree of freedom in design of the display device 101 can be easily improved, and the aesthetic appeal of the external appearance of the display device 101 can be increased.

The adhesive layer 174 may contain a material for adjusting transmittance of light. As the material for adjusting transmittance of light, for example, an optional material that attenuates transmittance of light may be used. As the material for adjusting transmittance of light, a material containing semitransparent resin may be used, or a material obtained by dispersing light absorption particles in a binder resin with relatively low density may be used. The material for adjusting transmittance of light may be a smoke material such as smoke pigment. The adhesive layer 174 contains the material for adjusting transmittance of light, so that transmittance of light may be attenuated to be 5 to 85%, for example.

In the display device 101, the adhesive layer 174 contains the material for adjusting transmittance of light, so that the reflection characteristic of the display region 1a and the reflection characteristic of the peripheral region 1b can be brought closer to each other. As a result, when observing the surface 1c of the display device 101 from the +X side, the boundary between the pixel part 8a and the peripheral part 8b of the liquid crystal panel 8 can be made inconspicuous and more seamless.

The adhesive layer 174 contains the material for adjusting transmittance of light, so that it is possible to further suppress reflection of unnecessary light at the interface between the polarizing plate 72 and the air layer AG, the unnecessary light coming from the outside and passing through the surface 1c of the display device 101 and the louver layer 5 to enter the polarizing plate 72, and it is possible to further suppress generation of an unnecessary pattern such as a rainbow and double images in the display region 1a of the display device 101.

The reflection suppressing film 73 may also include a moth-eye film (not illustrated). The reflection suppressing film 73 may be the AR film, the AG film, the moth-eye film, or a laminated film of two or more of them.

On the moth-eye film, a large number of nano-level minute projections are arranged at regular intervals. The moth-eye film hardly reflects entered light and can transmit the light due to its structure, and can mainly suppress specular reflection light. Due to this, it is possible to suppress reflection of unnecessary light at the interface between the rear surface of the polarizing plate 72 and the air layer AG.

The reflection suppressing film 81 may also include a moth-eye film (not illustrated). The reflection suppressing film 81 may be the AR film, the AG film, the moth-eye film, or a laminated film of two or more of them.

Due to this, it is possible to suppress reflection of unnecessary light at an interface between the air layer AG and a front surface of the liquid crystal layer 83.

Figure 7:
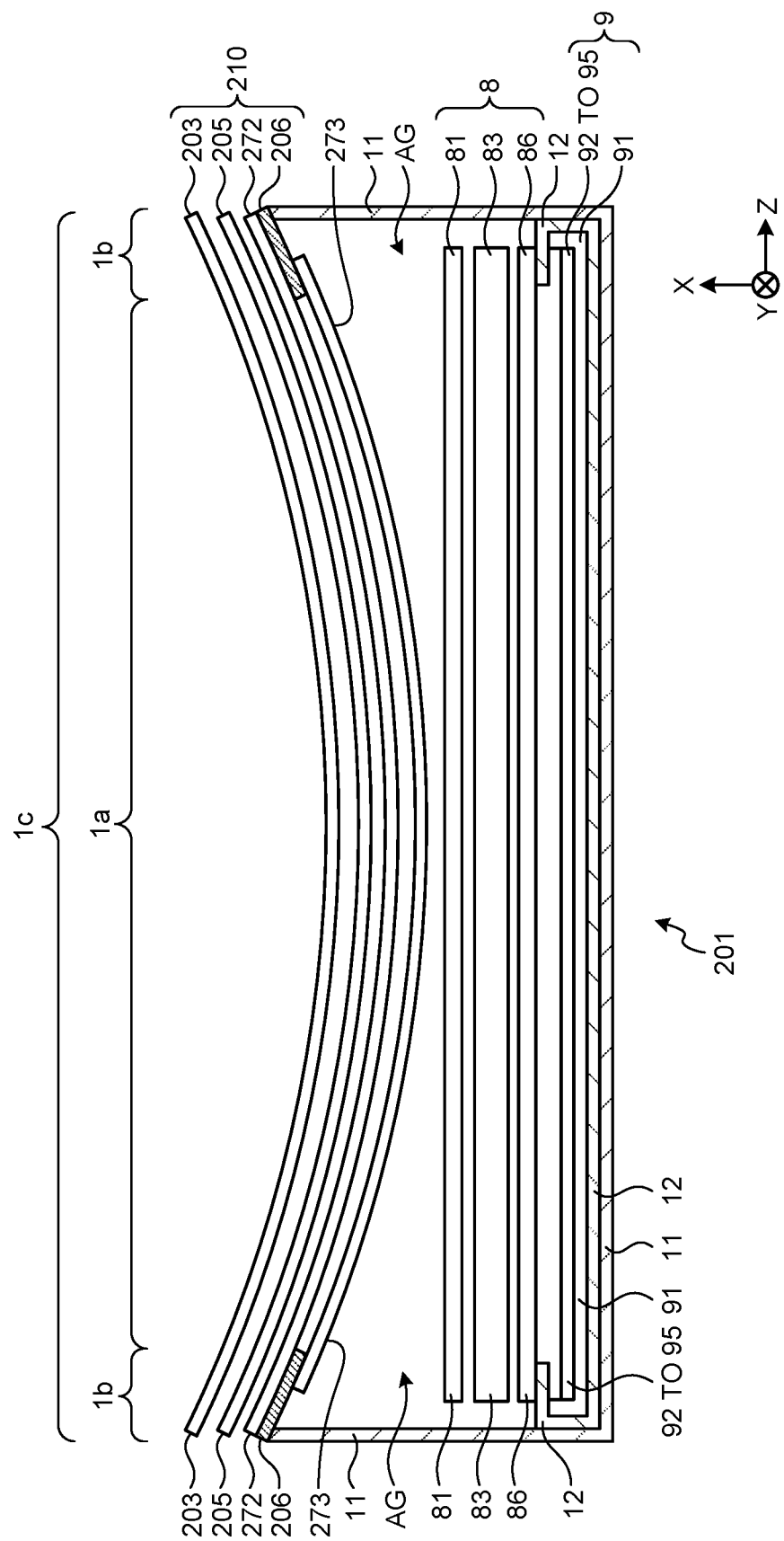
FIG. 7 is a cross-sectional view illustrating a configuration of a display device according to a modification of the second embodiment.

By employing the bonding-less structure for a display device 201, a cover panel 210 may be curved as illustrated in FIG. 7, for example. FIG. 7 is a cross-sectional view illustrating a configuration of the display device 201 according to a modification of the second embodiment. FIG. 7 exemplifies an XZ cross section corresponding to a case of cutting FIG. 1 along a line B-B.

The cover panel 210 has a curved surface. Each of a front surface and a rear surface of the cover panel 210 is a curved surface. Each of the front surface and the rear surface of the cover panel 210 may have a curved surface projecting toward the −X side, or may have a curved surface projecting toward the +X side. FIG. 7 exemplifies a configuration in which each of the front surface and the rear surface of the cover panel 210 has a curved surface projecting toward the −X side.

The bonding-less structure in which the cover panel 210 and the liquid crystal panel 8 are not coupled to each other over the surface is formed, but the cover panel 210 and the liquid crystal panel 8 may be held by the case 11 and the frame 12. The case 11 has a box shape opened on the +X side, and houses the liquid crystal panel 8 and the backlight 9 inside. A portion corresponding to the peripheral region 1b of the liquid crystal panel 8 is fixed to the case 11 via the frame 12. An end part on the +X side of the case 11 is coupled to a portion corresponding to the peripheral region 1b of the cover panel 210. Due to this, if the cover panel 210 is curved, the cover panel 210 and the liquid crystal panel 8 can be stably held.

In the cover panel 210, an optical layer 203 has a curved surface. Each of a front surface and a rear surface of the optical layer 203 is a curved surface. A louver layer 205 is arranged to opposed to a rear surface of the optical layer 203, and has a curved surface along the rear surface of the optical layer 203. Each of a front surface and a rear surface of the louver layer 205 is a curved surface. A polarizing plate 272 is arranged to be opposed to the rear surface of the louver layer 205, and has a curved surface along the rear surface of the louver layer 205. Each of a front surface and a rear surface of the polarizing plate 272 is a curved surface. The polarizing plate 272 is an example of the first polarizing plate. A light-shielding frame 206 is arranged to be opposed to the rear surface of the polarizing plate 272 at a YZ position corresponding to the peripheral region 1b, and has a curved surface along the rear surface of the polarizing plate 272. Each of a front surface and a rear surface of the light-shielding frame 206 is a curved surface. A reflection suppressing film 273 is arranged to be opposed to the rear surface of the polarizing plate 272 and opposed to the rear surface of the light-shielding frame 206, and has a curved surface along the rear surface of the polarizing plate 272 and the rear surface of the light-shielding frame 206. Each of a front surface and a rear surface of the reflection suppressing film 273 is a curved surface. Further, the cover panel 210 may include a first reflection suppressing film (not illustrated) arranged to be opposed to the front surface of the optical layer 203 and has a curved surface along the front surface of the optical layer 203.

Each of the optical layer 203, the louver layer 205, the polarizing plate 272, the light-shielding frame 206, and the reflection suppressing film 273 may have a curved surface projecting toward the −X side, or may have a curved surface projecting toward the +X side. FIG. 7 exemplifies a configuration in which each of the optical layer 203, the louver layer 205, the polarizing plate 272, the light-shielding frame 206, and the reflection suppressing film 273 has a curved surface projecting toward the −X side.

On the other hand, each of the liquid crystal panel 8 and the backlight 9 flatly extends in the YZ-direction. The air layer AG is interposed between the cover panel 210 and the liquid crystal panel 8.

In the display device 201 as described above, the polarizing plate 72 in front of the liquid crystal layer 83 of the liquid crystal panel 8 is arranged between the louver layer 205 and the air layer AG. Due to this, seamlessness of the display region 1a and the peripheral region 1b can be secured, and an unnecessary pattern can be prevented from being generated in the display region 1a at the same time in the display device 201 having the bonding-less structure. Thus, a degree of freedom in design of the display device 201 can be easily improved, and the aesthetic appeal of the external appearance of the display device 201 can be increased.

In the display device 201, the cover panel 210 has the curved surface. That is, each of the optical layer 203, the louver layer 205, the polarizing plate 272, the light-shielding frame 206, and the reflection suppressing film 273 has a curved surface. Due to this, the display device 201 can be configured to have a curved surface corresponding to a curved surface of an installation place such as an interior of a vehicle, and aesthetic appeal of external appearance of the display device 201 can be increased.

Third Embodiment

Next, the following describes a display device 301 according to a third embodiment. The following mainly describes differences from the first embodiment and the second embodiment.

Figure 8:
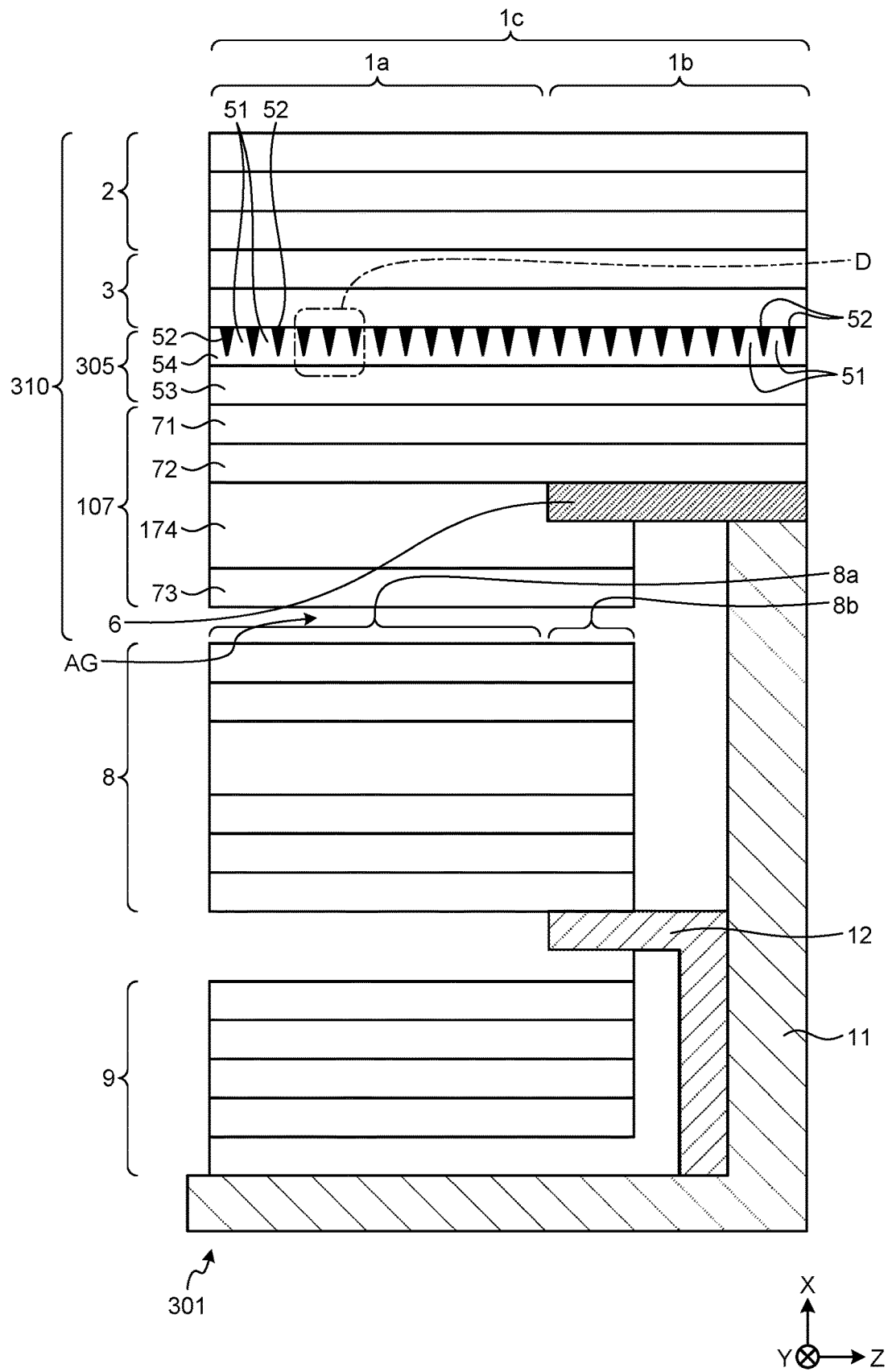
FIG. 8 is a cross-sectional view illustrating a configuration of a display device according to a third embodiment.

The first embodiment and the second embodiment exemplify the configuration in which the light absorbing members 52 in the louver layer 5 are arranged to be narrower from the −X side toward the +X side, but the third embodiment exemplifies a configuration in which the light absorbing members 52 in a louver layer 305 are reversely arranged in the X-direction as illustrated in FIG. 8. FIG. 8 is an XZ cross-sectional view illustrating a configuration of the display device 301 according to the third embodiment. FIG. 8 schematically illustrates an arrangement relation among respective layers in the structure of the XZ cross section, and a relation among the thicknesses of the respective layers may be different from the relation illustrated in the drawing. FIG. 8 exemplifies the structure of the XZ cross section corresponding to a portion extending in the Y-direction of the peripheral region 1b, but the concept of the present embodiment can also be applied to a structure of XY cross section corresponding to a portion extending in the Z-direction of the peripheral region 1b.

Figure 9:
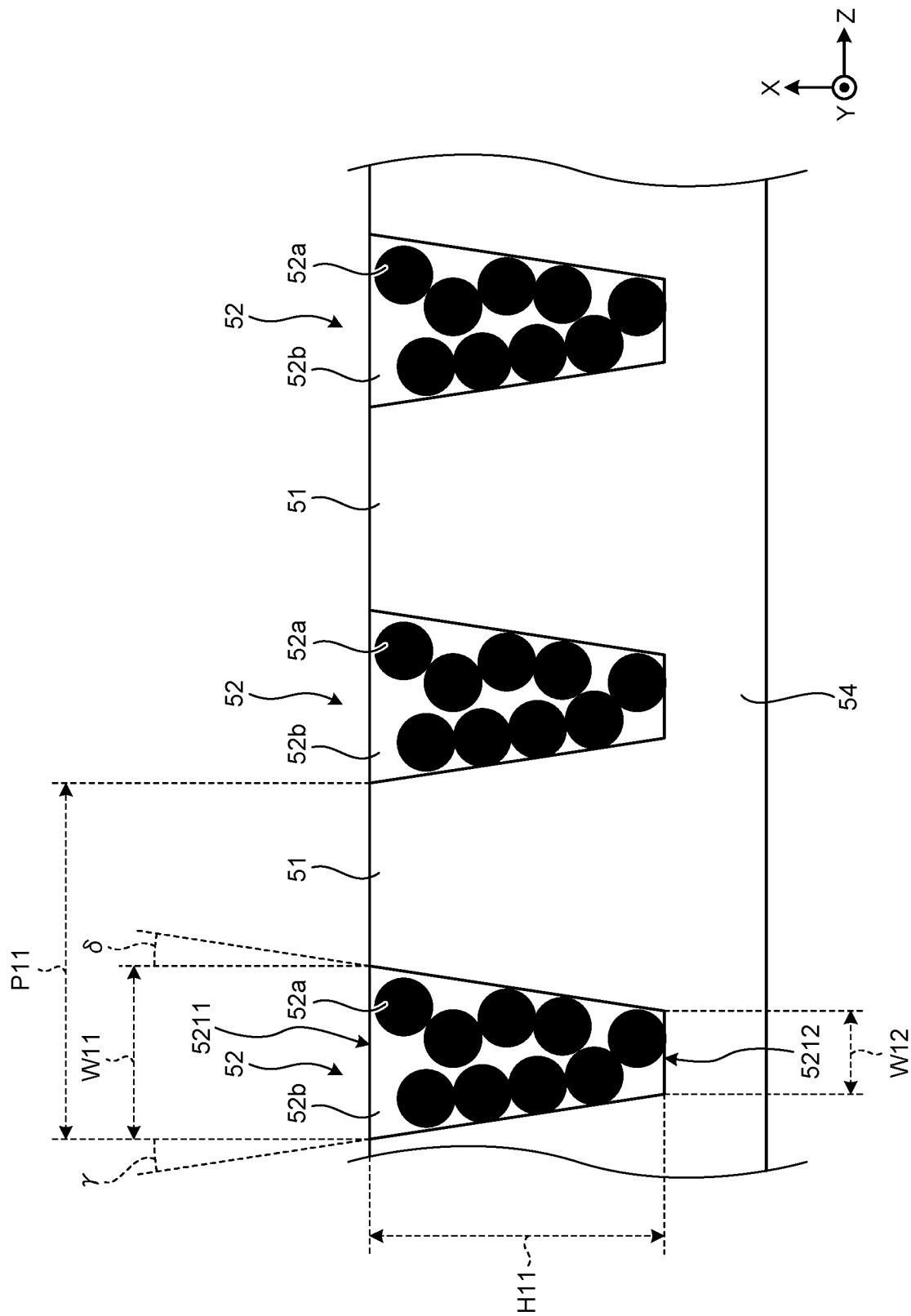
FIG. 9 is an enlarged cross-sectional view illustrating a configuration of a louver layer according to the third embodiment.

As compared with the display device 101 illustrated in FIG. 6, the display device 301 illustrated in FIG. 8 includes a cover panel 310 in place of the cover panel 110. The cover panel 310 includes the louver layer 305 in place of the louver layer 5. In the louver layer 305, the light transmitting members 51 are arranged on the +X side of the base material 53. The light absorbing members 52 are arranged on the +X side of the base material 53. As compared with the light absorbing members 52 illustrated in FIG. 6, the light absorbing members 52 illustrated in FIG. 8 are arranged to be narrower from the +X side toward the −X side as illustrated in FIG. 9. FIG. 9 is an enlarged cross-sectional view illustrating a configuration of the louver layer 305, which is a cross-sectional view enlarging a D portion in FIG. 8.

An XZ cross-sectional shape of the light absorbing member 52 is appropriate for being formed with low cost, and may be an optional shape appropriate for its function. From a viewpoint of lowering cost, a Z-direction dimension W11 on the +X side of the light absorbing member 52 is larger than a Z-direction dimension W12 on the −X side in an XZ cross-sectional view. A YZ cross-sectional area of a surface 5211 on the +X side of the light absorbing member 52 is larger than a YZ cross-sectional area of a surface 5212 on the −X side of the light absorbing member 52. FIG. 9 exemplifies a substantially trapezoidal shape including two parallel sides along the Z-direction as the XZ cross-sectional shape of the light absorbing member 52. The XZ cross-sectional shape of the light absorbing member 52 may be a substantially triangular shape including a base along the Z-direction.

The Z-direction dimension W11 on the +X side of the light absorbing member 52 is larger than the Z-direction dimension W12 on the −X side in the XZ cross-sectional view, so that it is possible to efficiently attenuate unnecessary light that is incident on the louver layer 305 from the outside. Due to this, the display device 301 can effectively suppress generation of an unnecessary pattern in the display region 1a when the display device 301 is not operating.

The Z-direction arrangement pitch P11 of the light absorbing member 52 may take an optional value appropriate for its function. From a viewpoint of effectively transmitting light of the liquid crystal panel 8 and blocking external light, the Z-direction arrangement pitch P11 of the light absorbing member 52 is preferably equal to or larger than 20 μm and equal to or smaller than 100 μm, and more preferably equal to or larger than 30 μm and equal to or smaller than 100 μm.

From a viewpoint of effectively transmitting light of the liquid crystal panel 8 and blocking external light, the Z-direction dimension W11 on the +X side of the light absorbing member 52 is preferably equal to or smaller than half of the Z-direction arrangement pitch P11. The Z-direction dimension W12 on the −X side of the light absorbing member 52 is preferably equal to or smaller than half of the Z-direction dimension W11 on the +X side.

An X-direction height H11 of the light absorbing member 52 may take an optional value appropriate for its function. From a viewpoint of effectively transmitting light of the liquid crystal panel 8 and blocking external light, the X-direction height H11 of the light absorbing member 52 is preferably equal to or larger than 50 μm and equal to or smaller than 150 μm, and more preferably equal to or larger than 60 μm and equal to or smaller than 150 μm.

An inclination angle γ of a side surface on the −Z side of the light absorbing member 52 may take an optional value appropriate for its function. From a viewpoint of effectively transmitting light of the liquid crystal panel 8 and blocking external light, the inclination angle γ is preferably larger than 0° and equal to or smaller than 10° as an inclination angle from the X-direction toward the −Z side.

An inclination angle δ of a side surface on the +Z side of the light absorbing member 52 may take an optional value appropriate for its function. From a viewpoint of effectively transmitting light of the liquid crystal panel 8 and blocking external light, the inclination angle δ is preferably larger than 0° and equal to or smaller than 10° as an inclination angle from the X-direction toward the +Z side.

In the display device 301, the louver layer 305 is disposed in front of the liquid crystal panel 8 and the light-shielding frame 6 similarly to the first embodiment and the second embodiment. Due to this, seamlessness of the display region 1a and the peripheral region 1b on the surface 1c of the display device 301 can be secured.

In the display device 301 as described above, the polarizing plate 72 in front of the liquid crystal layer 83 of the liquid crystal panel 8 is arranged between the louver layer 305 and the air layer AG. Due to this, seamlessness of the display region 1a and the peripheral region 1b can be secured, and an unnecessary pattern can be prevented from being generated in the display region 1a at the same time in the display device 301 having the bonding-less structure. Thus, a degree of freedom in design of the display device 301 can be easily improved, and the aesthetic appeal of the external appearance of the display device 301 can be increased.

Fourth Embodiment

Next, the following describes a display device 401 according to a fourth embodiment. The following mainly describes differences from the first embodiment to the third embodiment.

Figure 10:
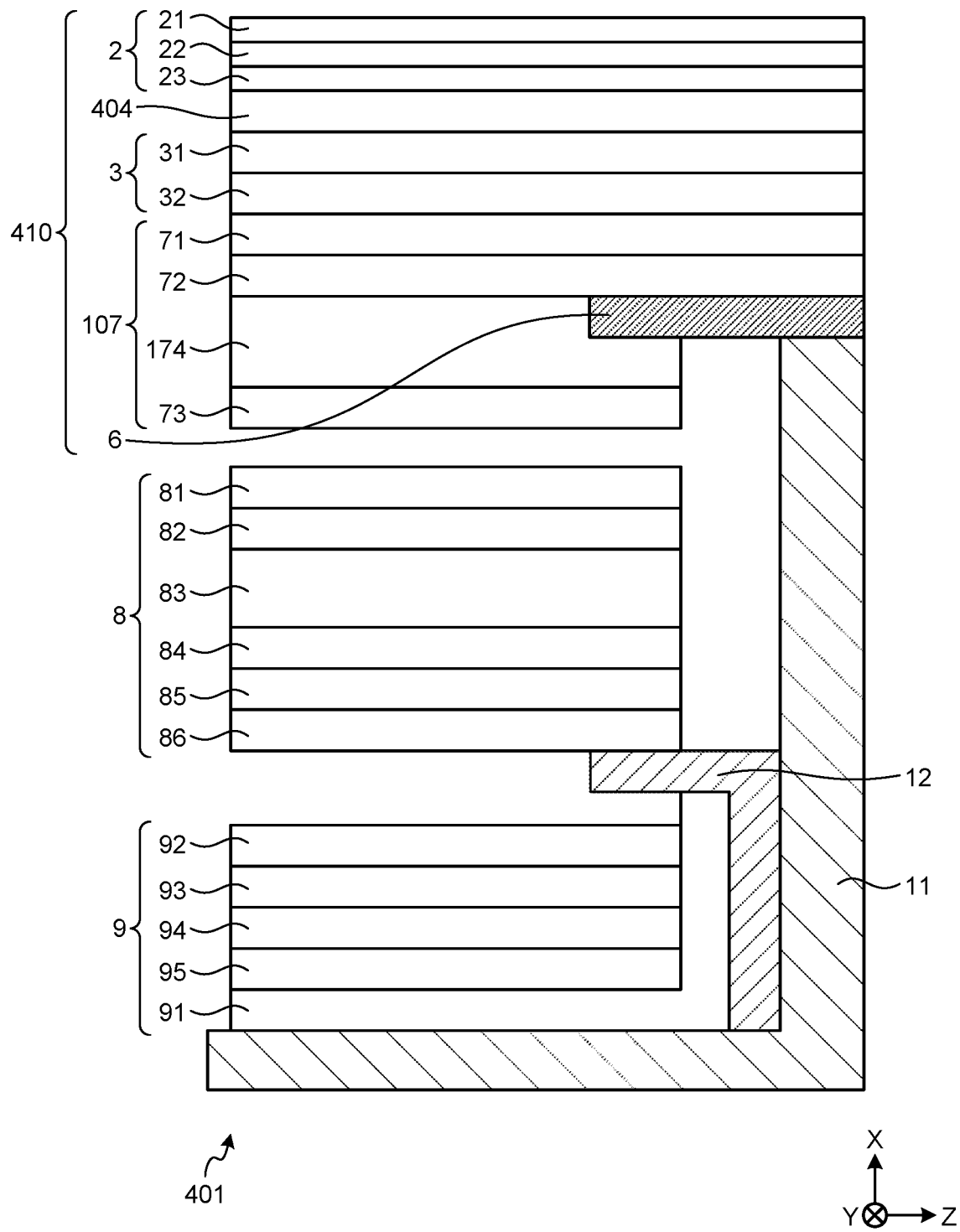
FIG. 10 is a cross-sectional view illustrating a configuration of a display device according to a fourth embodiment.

The first embodiment to the third embodiment exemplify the configuration in which the louver layer 305 is disposed in front of the liquid crystal panel 8 and the light-shielding frame 6, but the fourth embodiment exemplifies a configuration in which a decorative layer 404 is disposed in place of the louver layer 305. As illustrated in FIG. 10, the decorative layer 404 is disposed in front of the liquid crystal panel 8 and the light-shielding frame 6 similarly to the louver layer 305, but a specific arrangement position is slightly different from that of the louver layer 305. FIG. 10 is an XZ cross-sectional view illustrating a configuration of the display device 401 according to the fourth embodiment. FIG. 10 schematically illustrates an arrangement relation among respective layers in the structure of the XZ cross section, and a relation among the thicknesses of the respective layers may be different from the relation illustrated in the drawing. FIG. 10 exemplifies the structure of the XZ cross section corresponding to a portion extending in the Y-direction of the peripheral region 1b, but the concept of the present embodiment can also be applied to a structure of XY cross section corresponding to a portion extending in the Z-direction of the peripheral region 1b.

As compared with the display device 101 illustrated in FIG. 6, the display device 401 illustrated in FIG. 10 includes a cover panel 410 in place of the cover panel 110. The cover panel 410 includes the decorative layer 404 in place of the louver layer 5.

The decorative layer 404 is arranged between the reflection suppressing film 2 and the polarizing plate 72. The decorative layer 404 is arranged opposite to the liquid crystal panel 8 with respect to the light-shielding frame 6. The decorative layer 404 is arranged on the −X side of the reflection suppressing film 2, and arranged on the +X side of the optical layer 3, the light-shielding frame 6, the polarizing layer 107, and the liquid crystal panel 8. The decorative layer 404 is arranged between the reflection suppressing film 2 and the polarizing plate 72. The decorative layer 404 is arranged between the reflection suppressing film 2 and the optical layer 3. The light-shielding frame 6 is arranged between the decorative layer 404 and the liquid crystal panel 8. The light-shielding frame 6 overlaps the peripheral portion of the polarizing plate 72 when transparently viewed from the X-direction.

The decorative layer 404 extends in the YZ-direction in a plate shape, and has a substantially rectangular shape having a longitudinal direction in the Y-direction. The decorative layer 404 has a pattern in an XZ plan view. The pattern may be a wood-grain pattern, a carbon fiber pattern, or a metal microparticle pattern. Due to this, the display device 401 can cause a pattern corresponding to the pattern of the decorative layer 404 to be visually recognized on the surface 1c when the display device 401 is not operating, and aesthetic appeal of external appearance can be increased.

In the display device 401, the decorative layer 404 is disposed in front of the liquid crystal panel 8 and the light-shielding frame 6. In the display device 401, a difference between the reflectance of the display region 1a and the reflectance of the peripheral region 1b can be reduced, and a boundary between the display region 1a and the peripheral region 1b can be made inconspicuous when the display device 401 is not operating. That is, seamlessness of the display region 1a and the peripheral region 1b on the surface 1c can be secured, and the aesthetic appeal of the display device 401 can be increased.

Transmittance of light of the decorative layer 404 may be adjusted to be in a predetermined range. The predetermined range may be 5 to 85%. Due to this, the display device 401 can cause an image of the liquid crystal panel 8 to be displayed in the display region 1a in place of the pattern corresponding to the pattern of the decorative layer 404 when the display device 401 is operating, and a display function thereof can be properly implemented.

In the display device 401, the polarizing plate 72 in front of the liquid crystal layer 83 of the liquid crystal panel 8 is arranged between the decorative layer 404 and the air layer AG. Due to this, an image forming surface of the image of the liquid crystal panel 8 can be positioned near the decorative layer 404. As a result, the display device 401 can suppress blurring and the like of the image caused by the decorative layer 404, cause the image of the liquid crystal panel 8 to be clearly displayed in the display region 1a, and properly implement a display function thereof when the display device 401 is operating.

As described above, in the fourth embodiment, in the display device 401, the polarizing plate 72 in front of the liquid crystal layer 83 of the liquid crystal panel 8 is arranged between the decorative layer 404 and the air layer AG. Due to this, seamlessness of the display region 1a and the peripheral region 1b can be secured, and a displayed image in the display region 1a can be made clear at the same time in the display device 401 having the bonding-less structure. Thus, a degree of freedom in design of the display device 401 can be easily improved, aesthetic appeal of external appearance of the display device 401 can be increased, and display performance of the display device 401 can be improved.

The display device 401 illustrated in FIG. 10 may have a configuration not including the light-shielding frame 6. In this case, a pattern corresponding to a pattern of the decorative layer 404 is visually recognized on the surface 1c of the display device 401 when the display device 401 is not operating, so that elements, wiring, terminals, and the like on the peripheral part 8b of the liquid crystal panel 8 can be hidden to some degree, and aesthetic appeal of external appearance can be increased.

Fifth Embodiment

Next, the following describes a display device 501 according to a fifth embodiment. The following mainly describes differences from the first embodiment to the fourth embodiment.

Figure 11:
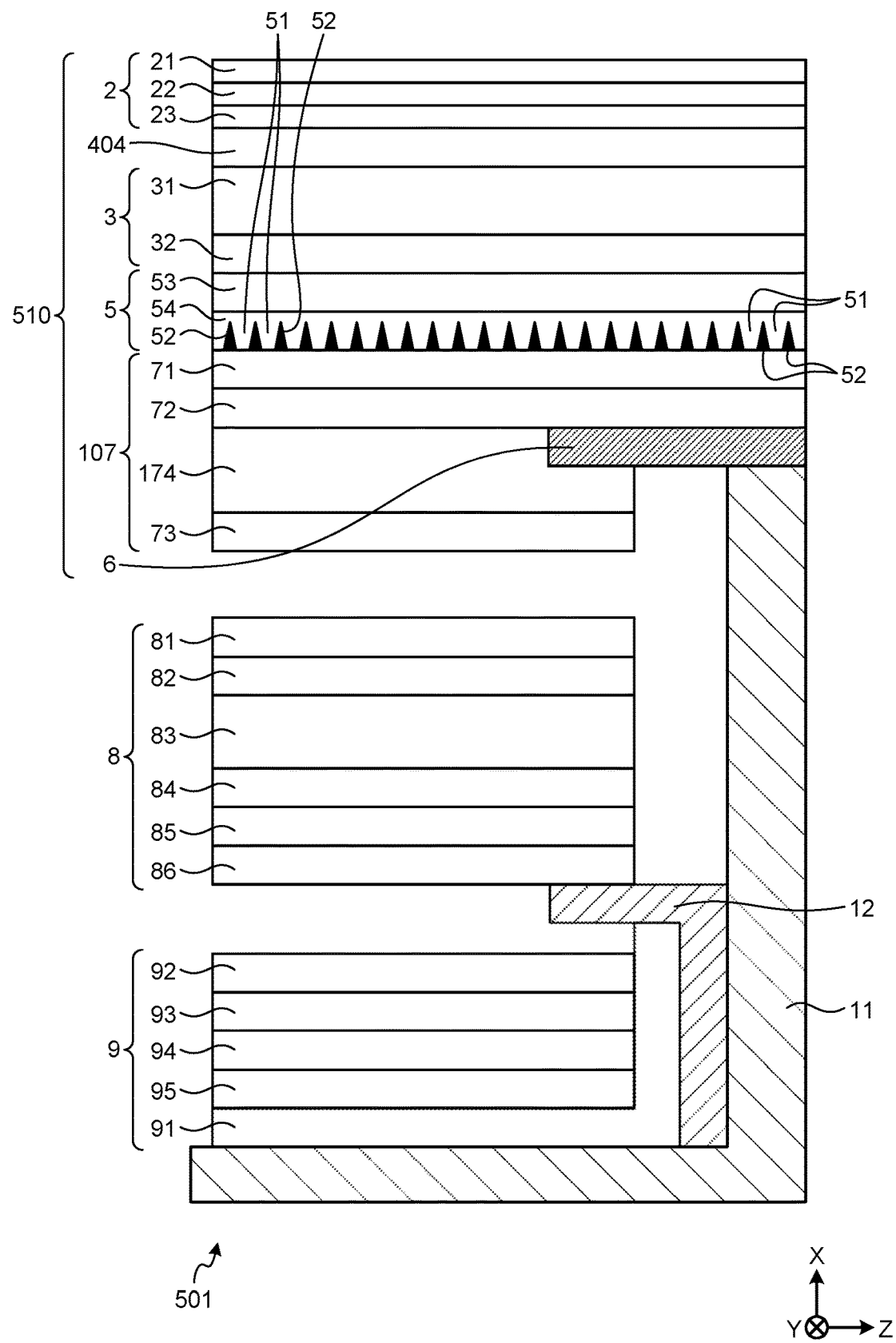
FIG. 11 is a cross-sectional view illustrating a configuration of a display device according to a fifth embodiment.

The first embodiment to the third embodiment exemplify the configuration in which the louver layers 5 and 305 are disposed in front of the liquid crystal panel 8 and the light-shielding frame 6, and the fourth embodiment exemplifies the configuration in which the decorative layer 404 is disposed in place of the louver layer 5. The fifth embodiment exemplifies a configuration in which the decorative layer 404 is disposed in addition to the louver layer 5. As illustrated in FIG. 11, the louver layer 5 and the decorative layer 404 are similarly disposed in front of the liquid crystal panel 8 and the light-shielding frame 6, but specific arrangement positions thereof are different from each other. FIG. 11 is an XZ cross-sectional view illustrating a configuration of the display device 501 according to the fifth embodiment. FIG. 11 schematically illustrates an arrangement relation among respective layers in the structure of the XZ cross section, and a relation among the thicknesses of the respective layers may be different from the relation illustrated in the drawing. FIG. 11 exemplifies the structure of the XZ cross section corresponding to a portion extending in the Y-direction of the peripheral region 1b, but the concept of the present embodiment can also be applied to a structure of XY cross section corresponding to a portion extending in the Z-direction of the peripheral region 1b.

As compared with the display device 401 illustrated in FIG. 10, the display device 501 illustrated in FIG. 11 includes a cover panel 510 in place of the cover panel 410. The cover panel 510 includes the decorative layer 404 in addition to the louver layer 5. The louver layer 5 is arranged between the decorative layer 404 and the polarizing plate 72.

The configuration and the function of the louver layer 5 are the same as those in the first embodiment. The configuration and the function of the decorative layer 404 are the same as those in the fourth embodiment.

In the display device 501, each of the decorative layer 404 and the louver layer 5 is disposed in front of the liquid crystal panel 8 and the light-shielding frame 6. The decorative layer 404 is arranged on the +X side of the louver layer 5. In the display device 401, a difference between the reflectance of the display region 1a and the reflectance of the peripheral region 1b can be reduced by the decorative layer 404, and further reduced by the louver layer 5. In the display device 401, the difference between the reflectance of the display region 1a and the reflectance of the peripheral region 1b can be reduced in two stages, and the boundary between the display region 1a and the peripheral region 1b can be made more inconspicuous when the display device 401 is not operating. That is, seamlessness of the display region 1a and the peripheral region 1b on the surface 1c can be further secured, and the aesthetic appeal of the display device 401 can be further increased.

Transmittance of light of the decorative layer 404 may be adjusted to be in a predetermined range. The predetermined range may be 5 to 85%. Due to this, the display device 501 can cause an image of the liquid crystal panel 8 to be displayed in the display region 1a in place of the pattern corresponding to the pattern of the decorative layer 404 when the display device 501 is operating, and a display function thereof can be properly implemented.

In the display device 501, the polarizing plate 72 in front of the liquid crystal layer 83 of the liquid crystal panel 8 is arranged between the decorative layer 404 and the air layer AG. Due to this, an image forming surface of the image of the liquid crystal panel 8 can be positioned to be closer to the decorative layer 404 than the liquid crystal panel 8 with respect to the decorative layer 404. As a result, the display device 501 can suppress blurring and the like of the image caused by the decorative layer 404, cause the image of the liquid crystal panel 8 to be clearly displayed in the display region 1a, and properly implement a display function thereof when the display device 501 is operating.

As described above, in the fifth embodiment, in the display device 501, the decorative layer 404 is arranged in front of the louver layer 5, and the polarizing plate 72 in front of the liquid crystal layer 83 of the liquid crystal panel 8 is arranged between the louver layer 5 and the air layer AG. Due to this, seamlessness of the display region 1a and the peripheral region 1b can be further secured, and a displayed image in the display region 1a can be made clear at the same time in the display device 501 having the bonding-less structure. Thus, a degree of freedom in design of the display device 501 can be easily improved, aesthetic appeal of external appearance of the display device 501 can be further increased, and display performance of the display device 501 can be improved.

The display device 501 illustrated in FIG. 11 may have a configuration not including the light-shielding frame 6. In this case, a pattern corresponding to a pattern of the decorative layer 404 is visually recognized on the surface 1c of the display device 501 when the display device 501 is not operating, so that elements, wiring, terminals, and the like on the peripheral part 8b of the liquid crystal panel 8 can be hidden to some degree, and aesthetic appeal of external appearance can be increased.

Sixth Embodiment

Next, the following describes a display device 601 according to a sixth embodiment. The following mainly describes differences from the first embodiment to the fifth embodiment.

Figure 12:
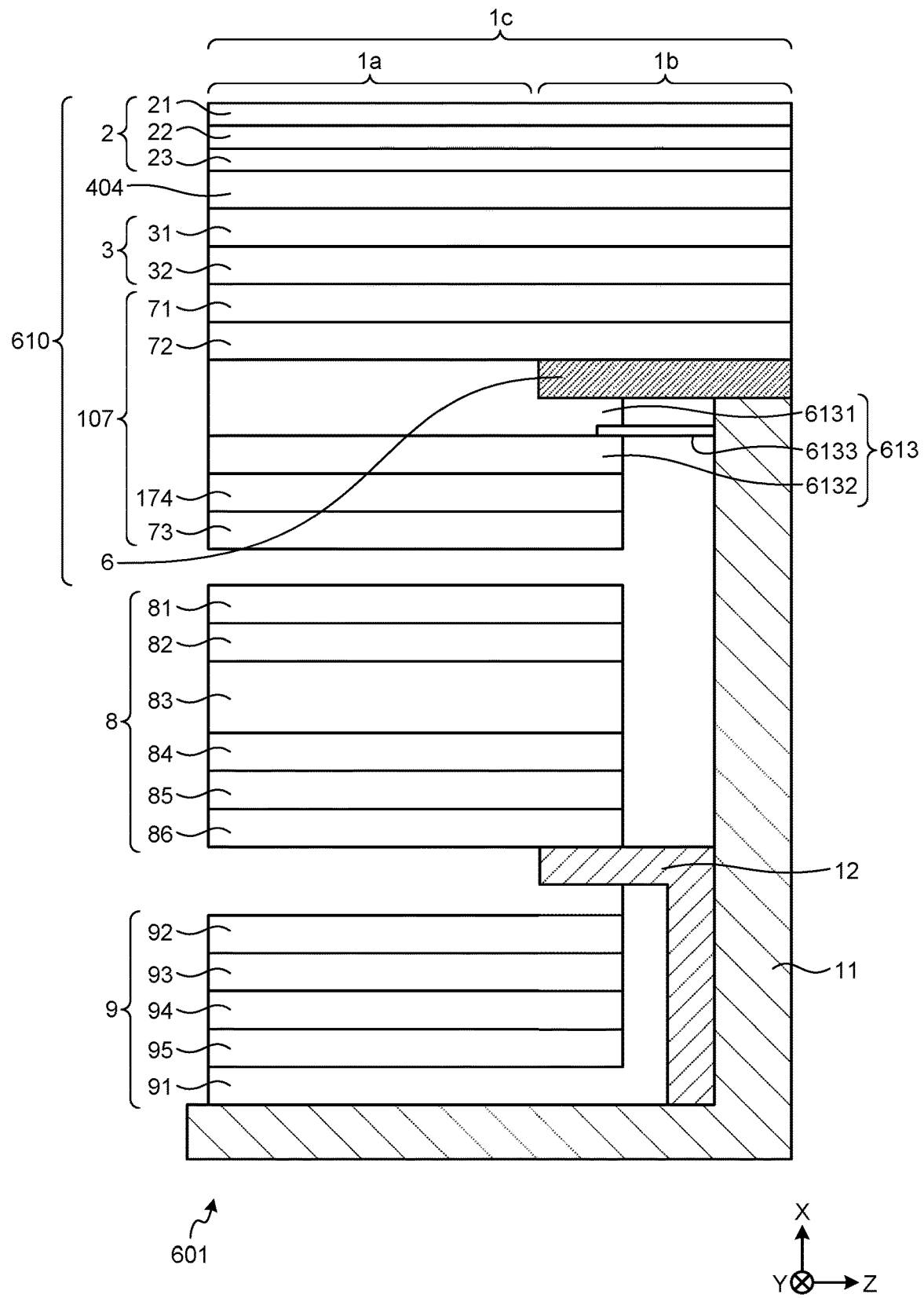
FIG. 12 is a cross-sectional view illustrating a configuration of a display device according to a sixth embodiment.

The fourth embodiment and the fifth embodiment exemplify the configuration focusing on the aesthetic appeal and the display function of the display device 501, but the sixth embodiment exemplifies a configuration focusing on an operation function in addition to the aesthetic appeal and the display function of the display device 601 as illustrated in FIG. 12. FIG. 12 is an XZ cross-sectional view illustrating a configuration of the display device 601 according to the sixth embodiment. FIG. 12 schematically illustrates an arrangement relation among respective layers in the structure of the XZ cross section, and a relation among the thicknesses of the respective layers may be different from the relation illustrated in the drawing. FIG. 12 exemplifies the structure of the XZ cross section corresponding to a portion extending in the Y-direction of the peripheral region 1b, but the concept of the present embodiment can also be applied to a structure of XY cross section corresponding to a portion extending in the Z-direction of the peripheral region 1b.

As compared with the display device 401 illustrated in FIG. 10, the display device 601 illustrated in FIG. 12 further includes a touch panel 613. The touch panel 613 is arranged between the polarizing plate 72 and the liquid crystal panel 8, and arranged between the polarizing plate 72 and the air layer AG. The touch panel 613 may be inserted into the polarizing layer 107 to be arranged between the polarizing plate 72 and the adhesive layer 174.

The touch panel 613 is arranged outside the liquid crystal panel 8, so that it can be regarded as an out-cell type touch panel. The touch panel 613 is arranged between the liquid crystal layer 83 and the polarizing plate 72 in front thereof, so that it can be regarded as an on-cell type touch panel.

The touch panel 613 includes an adhesive layer 6131, a touch sensor 6132, and a peripheral circuit part 6133.

The adhesive layer 6131 contains a translucent adhesive, and bonds the touch sensor 6132 to the polarizing plate 72. The translucent adhesive may be an optical glue such as an OCR or an OCA.

The touch sensor 6132 is arranged in a region corresponding to the display region 1a. The touch sensor 6132 includes a plurality of first electrodes and a plurality of second electrodes that are separately arranged in the X-direction. Each of the first electrodes extends in the Y-direction. Each of the second electrodes extends in the Z-direction. The first electrodes and the second electrodes form a plurality of intersecting positions.

The peripheral circuit part 6133 is arranged in a region corresponding to the peripheral region 1b. In the peripheral circuit part 6133, elements, wiring, terminals, and the like for a circuit are arranged on a predetermined substrate. This circuit includes a circuit for controlling the first electrodes and the second electrodes. The peripheral circuit part 6133 can detect changes in physical quantities at the intersecting positions of the first electrodes and the second electrodes. If the touch panel 613 is a resistance film type, the peripheral circuit part 6133 detects a resistance change that is caused when a pair of electrodes are brought into contact with each other at an intersecting position touched by the user 100 among the intersecting positions, and detects a touch position. If the touch panel 613 is a projection capacitive type, the peripheral circuit part 6133 detects a capacitance change at an intersecting position touched by the user 100 among the intersecting positions, and detects a touch position.

At this point, the light-shielding frame 6 may be arranged between the polarizing plate 72 and the touch panel 613 in a region corresponding to the peripheral region 1b. Due to this, the elements, the wiring, the terminals, and the like of the peripheral circuit part 6133 can be hidden, and aesthetic appeal of external appearance of the display device 601 can be increased.

As described above, in the sixth embodiment, the touch panel 613 is arranged between the polarizing plate 72 and the liquid crystal panel 8 in the display device 601. At this point, in a region corresponding to the peripheral region 1b, the light-shielding frame 6 covers the peripheral circuit part 6133 from the +X side. Due to this, seamlessness of the display region 1a and the peripheral region 1b can be secured, a displayed image in the display region 1a can be made clear, and operability of the display device 601 can be improved at the same time in the display device 601 having the bonding-less structure. Thus, a degree of freedom in design of the display device 601 can be easily improved, aesthetic appeal of external appearance of the display device 601 can be increased, and display performance and operation performance of the display device 601 can be improved.

The fifth embodiment may be combined with the sixth embodiment. That is, in the display device 601 illustrated in FIG. 12, the cover panel 610 may include the louver layer 5 in addition to the decorative layer 404. The configuration and the function of the louver layer 5 are the same as those in the first embodiment. The configuration and the function of the decorative layer 404 are the same as those in the fourth embodiment.

In the display device 601 as described above, seamlessness of the display region 1a and the peripheral region 1b can be secured, a displayed image in the display region 1a can be made clear, and operability of the display device 601 can be improved at the same time in the display device 601 having the bonding-less structure. Thus, a degree of freedom in design of the display device 601 can be easily improved, aesthetic appeal of external appearance of the display device 601 can be increased, and display performance and operation performance of the display device 601 can be improved.

Note 1

A cover panel arranged to be separated from a liquid crystal panel, the cover panel including:
a first reflection suppressing film; and a first polarizing plate that is arranged between the first reflection suppressing film and a liquid crystal panel, and polarizes light, and further including at least one of a louver layer and a decorative layer, the louver layer including light transmitting members and light absorbing members repeatedly arranged between the first reflection suppressing film and the first polarizing plate, the light transmitting members transmitting light, the light absorbing members absorbing light, the decorative layer having a pattern.

Note 2

The cover panel according to Note 1, further including a light-shielding frame that is arranged between the at least one of the louver layer and the decorative layer, and the liquid crystal panel, and overlaps a peripheral portion of the first polarizing plate when transparently viewed from a direction perpendicular to a front surface of the first reflection suppressing film.

Note 3

The cover panel according to Note 1, wherein the cover panel includes the louver layer between the first reflection suppressing film and the first polarizing plate.

Note 4

The cover panel according to Note 3, further including a light-shielding frame that is arranged between the louver layer and the liquid crystal panel, and overlaps a peripheral portion of the first polarizing plate when transparently viewed from a direction perpendicular to a front surface of the first reflection suppressing film.

Note 5

The cover panel according to Note 4, wherein the light-shielding frame is arranged between the louver layer and the first polarizing plate.

Note 6

The cover panel according to any one of Notes 3 to 5, wherein a first cross-sectional area of the light absorbing members parallel to a front surface of the first reflection suppressing film is smaller than a second cross-sectional area of the light absorbing members parallel to the front surface of the first reflection suppressing film and at a position closer to the first polarizing plate.

Note 7

The cover panel according to any one of Notes 3 to 5, wherein a first cross-sectional area of the light absorbing members parallel to a front surface of the first reflection suppressing film is larger than a second cross-sectional area of the light absorbing members parallel to the front surface of the first reflection suppressing film and at a position closer to the first polarizing plate.

Note 8

The cover panel according to Note 1, wherein the cover panel includes the decorative layer between the first reflection suppressing film and the first polarizing plate.

Note 9

The cover panel according to Note 8, further including a light-shielding frame that is arranged between the decorative layer and the liquid crystal panel, and overlaps a peripheral portion of the first polarizing plate when transparently viewed from a direction perpendicular to a front surface of the first reflection suppressing film.

Note 10

The cover panel according to Note 4 or Note 9, further including a touch panel arranged between the first polarizing plate and the liquid crystal panel, wherein
the light-shielding frame is arranged between the first polarizing plate and the touch panel.

Note 11

The cover panel according to any one of Notes 2, 4, and 9, wherein the light-shielding frame is arranged between the first polarizing plate and the liquid crystal panel.

Note 12

The cover panel according to any one of Notes 1 to 11, wherein
the first polarizing plate includes a first surface facing the first reflection suppressing film and a second surface opposite to the first surface, and
the cover panel further includes a second reflection suppressing film that is arranged to be opposed to the second surface and suppresses reflection of light at the second surface.

Note 13

The cover panel according to Note 12, wherein the second reflection suppressing film is bonded to the second surface by an adhesive layer containing a material for adjusting transmittance of light.

Note 14

The cover panel according to any one of Notes 1 to 13, wherein the cover panel has a curved surface.

Note 15

The cover panel according to Note 1, wherein the cover panel includes the decorative layer between the first reflection suppressing film and the first polarizing plate, and includes the louver layer between the decorative layer and the first polarizing plate.

Note 16

The cover panel according to Note 15, further including a light-shielding frame that is arranged between the louver layer and the liquid crystal panel, and overlaps a peripheral portion of the first polarizing plate when transparently viewed from a direction perpendicular to a front surface of the first reflection suppressing film.

Note 17

The cover panel according to Note 15, further including a touch panel arranged between the first polarizing plate and the liquid crystal panel.

Note 18

The cover panel according to Note 17, further including a light-shielding frame that is arranged between the first polarizing plate and the touch panel, and overlaps a peripheral portion of the first polarizing plate when transparently viewed from a direction perpendicular to a front surface of the first reflection suppressing film.

Note 19

A display device including:
a liquid crystal panel; and
the cover panel according to any one of Notes 1 to 18 that is arranged to be opposed to a front surface of the liquid crystal panel and to be separated from the liquid crystal panel, wherein
the liquid crystal panel includes:
a liquid crystal layer; and
a second polarizing plate that is arranged to be opposed to a rear surface of the liquid crystal layer, and polarizes light.

Note 20

The display device according to Note 19, further including a support member connected to an edge of the cover panel and an edge of the liquid crystal panel.

Advantageous Effect of Embodiment

With the cover panel and the display device according to the present disclosure, it is possible to provide the cover panel and the display device appropriate for increasing the aesthetic appeal of the display device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A cover panel comprising:
a first reflection suppressing film; and
a first polarizing plate that is arranged between the first reflection suppressing film and a liquid crystal panel, and polarizes light, and
further comprising a louver layer, the louver layer including light transmitting members and light absorbing members repeatedly arranged between the first reflection suppressing film and the first polarizing plate, the light transmitting members transmitting light, the light absorbing members absorbing light, wherein
the cover panel is spaced apart from the liquid crystal panel by an air layer,
the first polarizing plate is arranged between the air layer and the louver layer, and
the louver layer is bonded to the first polarizing plate by an adhesive layer.

2. The cover panel according to claim 1, further comprising a light-shielding frame that is arranged between the louver layer, and the liquid crystal panel, and overlaps a peripheral portion of the first polarizing plate when transparently viewed from a direction perpendicular to a front surface of the first reflection suppressing film.

3. The cover panel according to claim 2, wherein the light-shielding frame is arranged between the first polarizing plate and the liquid crystal panel.

4. The cover panel according to claim 1, wherein the light-shielding frame is arranged between the louver layer and the first polarizing plate.

5. The cover panel according to claim 1, wherein a first cross-sectional area of the light absorbing members parallel to a front surface of the first reflection suppressing film is smaller than a second cross-sectional area of the light absorbing members parallel to the front surface of the first reflection suppressing film and at a position closer to the first polarizing plate.

6. The cover panel according to claim 1, wherein a first cross-sectional area of the light absorbing members parallel to a front surface of the first reflection suppressing film is larger than a second cross-sectional area of the light absorbing members parallel to the front surface of the first reflection suppressing film and at a position closer to the first polarizing plate.

7. The cover panel according to claim 2, further comprising a touch panel arranged between the first polarizing plate and the liquid crystal panel, wherein
the light-shielding frame is arranged between the first polarizing plate and the touch panel.

8. The cover panel according to claim 1, wherein
the first polarizing plate includes a first surface facing the first reflection suppressing film and a second surface opposite to the first surface, and
the cover panel further comprises a second reflection suppressing film that is arranged to be opposed to the second surface and suppresses reflection of light at the second surface.

9. The cover panel according to claim 8, wherein the second reflection suppressing film is bonded to the second surface by an adhesive layer containing a material for adjusting transmittance of light.

10. The cover panel according to claim 1, wherein the cover panel has a curved surface.

11. The cover panel according to claim 1, wherein the cover panel comprises a decorative layer between the first reflection suppressing film and the first polarizing plate, and comprises the louver layer between the decorative layer and the first polarizing plate.

12. The cover panel according to claim 11, further comprising a light-shielding frame that is arranged between the louver layer and the liquid crystal panel, and overlaps a peripheral portion of the first polarizing plate when transparently viewed from a direction perpendicular to a front surface of the first reflection suppressing film.

13. The cover panel according to claim 11, further including a touch panel arranged between the first polarizing plate and the liquid crystal panel.

14. The cover panel according to claim 13, further comprising a light-shielding frame that is arranged between the first polarizing plate and the touch panel, and overlaps a peripheral portion of the first polarizing plate when transparently viewed from a direction perpendicular to a front surface of the first reflection suppressing film.

15. A display device comprising:
   the liquid crystal panel; and
   the cover panel according to claim 1 that is arranged to be opposed to a front surface of the liquid crystal panel and to be spaced apart from the liquid crystal panel by the air layer, wherein
   the liquid crystal panel includes:
      a liquid crystal layer; and
      a second polarizing plate that is arranged to be opposed to a rear surface of the liquid crystal layer, and polarizes light.

16. The display device according to claim 15, wherein no polarizing plate is arranged between the first polarizing plate and the liquid crystal layer.

* * * * *